(12) United States Patent
Namgoong et al.

(10) Patent No.: US 10,444,886 B2
(45) Date of Patent: Oct. 15, 2019

(54) METHOD AND ELECTRONIC DEVICE FOR PROVIDING USER INTERFACE

(71) Applicant: Samsung Electronics Co., Ltd., Gyeonggi-do (KR)

(72) Inventors: Bo Ram Namgoong, Seoul (KR); Su Hyun Kim, Gyeonggi-do (KR); Jin Sagong, Gyeonggi-do (KR); Ha Youl Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 231 days.

(21) Appl. No.: 15/331,206

(22) Filed: Oct. 21, 2016

(65) Prior Publication Data
US 2017/0115793 A1 Apr. 27, 2017

(30) Foreign Application Priority Data
Oct. 21, 2015 (KR) .......................... 10-2015-0146707

(51) Int. Cl.
*G06F 1/16* (2006.01)
*G06F 3/041* (2006.01)
(Continued)

(52) U.S. Cl.
CPC .......... *G06F 3/0414* (2013.01); *G06F 1/1626* (2013.01); *G06F 1/1647* (2013.01);
(Continued)

(58) Field of Classification Search
CPC .... G06F 1/1626; G06F 1/1647; G06F 1/1692; G06F 2203/04105; G06F 2203/04806;
(Continued)

(56) References Cited

U.S. PATENT DOCUMENTS 8,059,099 B2 11/2011 Lampell et al.
8,416,148 B1 4/2013 Park
(Continued)

FOREIGN PATENT DOCUMENTS

EP         2 426 597        3/2012
KR    1020110125356    11/2011
KR    1020130127288    11/2013

OTHER PUBLICATIONS

European Search Report dated Mar. 6, 2017 issued in counterpart application No. 16194380.8-1879, 9 pages.
(Continued)

*Primary Examiner* — Hong Zhou
(74) *Attorney, Agent, or Firm* — The Farrell Law Firm, P.C.

(57) ABSTRACT

An electronic device and a user interface providing method of the electronic device is provided. The electronic device includes a first display disposed on a first surface of the electronic device, a second display disposed on a second surface opposite to the first surface of the electronic device; and a processor. The processor outputs, on the first display, a specified object. The first display includes a display panel that displays the specified object, a touch panel that receives a touch input for the specified object, and a pressure sensor that senses a pressure of the touch input. The processor further outputs, on the second display, content associated with the touched specified object based on the pressure of the touch input.

18 Claims, 22 Drawing Sheets

(51) Int. Cl.
*G06F 3/0484* (2013.01)
*G06F 3/0488* (2013.01)
*G09G 5/14* (2006.01)
*G06F 3/0482* (2013.01)

(52) U.S. Cl.
CPC .......... *G06F 1/1692* (2013.01); *G06F 3/0482* (2013.01); *G06F 3/0488* (2013.01); *G06F 3/04845* (2013.01); *G06F 3/04883* (2013.01); *G09G 5/14* (2013.01); *G06F 2203/04105* (2013.01); *G06F 2203/04806* (2013.01)

(58) Field of Classification Search
CPC .. G06F 3/0414; G06F 3/0482; G06F 3/04845; G06F 3/0488; G06F 3/04883; G09G 5/14
See application file for complete search history.

(56) References Cited

U.S. PATENT DOCUMENTS

| | | | |
|---|---|---|---|
| 8,493,342 B2 | 7/2013 | Park et al. | |
| 8,593,371 B1 | 11/2013 | Park | |
| 8,633,916 B2 | 1/2014 | Bernstein et al. | |
| 8,749,510 B2 | 6/2014 | Park et al. | |
| 8,797,295 B2 | 8/2014 | Bernstein et al. | |
| 8,872,730 B2 | 10/2014 | Park | |
| 8,922,523 B2 | 12/2014 | Lynch et al. | |
| 8,928,594 B2 | 1/2015 | Chang et al. | |
| 8,933,890 B2 | 1/2015 | Lampell et al. | |
| 8,943,427 B2 | 1/2015 | Heo et al. | |
| 8,988,876 B2 | 3/2015 | Corbin et al. | |
| 9,013,416 B2 | 4/2015 | Huang et al. | |
| 9,170,698 B2 | 10/2015 | Chang et al. | |
| 9,176,650 B2 | 11/2015 | Park et al. | |
| 9,262,002 B2 | 2/2016 | Momeyer et al. | |
| 9,274,660 B2 | 3/2016 | Bernstein et al. | |
| 9,280,248 B2 | 3/2016 | Bernstein et al. | |
| 9,335,793 B2 | 5/2016 | Rothkopf | |
| 9,400,582 B2 | 7/2016 | Bernstein et al. | |
| 2006/0284858 A1* | 12/2006 | Rekimoto | G06F 3/033 345/173 |
| 2007/0279394 A1 | 12/2007 | Lampell et al. | |
| 2008/0018616 A1 | 1/2008 | Lampell et al. | |
| 2009/0066663 A1 | 3/2009 | Chang et al. | |
| 2010/0026640 A1 | 2/2010 | Kim et al. | |
| 2010/0085317 A1 | 4/2010 | Park et al. | |
| 2011/0063248 A1 | 3/2011 | Yoon | |
| 2011/0141052 A1 | 6/2011 | Bernstein et al. | |
| 2012/0060089 A1 | 3/2012 | Heo et al. | |
| 2012/0068957 A1 | 3/2012 | Puskarich et al. | |
| 2012/0105348 A1 | 5/2012 | Lampell et al. | |
| 2012/0105358 A1 | 5/2012 | Momeyer et al. | |
| 2012/0194448 A1 | 8/2012 | Rothkopf | |
| 2012/0218191 A1 | 8/2012 | Huang et al. | |
| 2013/0135244 A1 | 5/2013 | Lynch et al. | |
| 2013/0229371 A1* | 9/2013 | Lee | G06F 3/0414 345/173 |
| 2013/0285963 A1 | 10/2013 | Park et al. | |
| 2013/0300689 A1 | 11/2013 | Park | |
| 2013/0346913 A1 | 12/2013 | Smith | |
| 2014/0002388 A1 | 1/2014 | Han et al. | |
| 2014/0009441 A1 | 1/2014 | Bernstein et al. | |
| 2014/0028575 A1 | 1/2014 | Parivar et al. | |
| 2014/0049911 A1 | 2/2014 | Corbin et al. | |
| 2014/0062931 A1 | 3/2014 | Park | |
| 2014/0085213 A1 | 3/2014 | Huppi et al. | |
| 2014/0085247 A1 | 3/2014 | Leung et al. | |
| 2014/0085253 A1 | 3/2014 | Leung et al. | |
| 2014/0092064 A1 | 4/2014 | Bernstein et al. | |
| 2014/0098075 A1* | 4/2014 | Kwak | G06F 3/0487 345/204 |
| 2014/0111456 A1 | 4/2014 | Kashiwa et al. | |
| 2014/0247239 A1 | 9/2014 | Jamshidi-Roudbari et al. | |
| 2014/0289655 A1 | 9/2014 | Park et al. | |
| 2014/0362014 A1* | 12/2014 | Ullrich | G06F 3/016 345/173 |
| 2015/0084925 A1 | 3/2015 | Chang et al. | |
| 2015/0103050 A1 | 4/2015 | Lynch et al. | |
| 2015/0153783 A1 | 6/2015 | Corbin et al. | |
| 2015/0160773 A1 | 6/2015 | Bernstein et al. | |
| 2015/0234629 A1 | 8/2015 | Park | |
| 2015/0293631 A1 | 10/2015 | Bernstein et al. | |
| 2015/0355821 A1 | 12/2015 | Park et al. | |
| 2016/0048262 A1 | 2/2016 | Chang et al. | |
| 2016/0070401 A1 | 3/2016 | Kim et al. | |
| 2016/0103530 A1 | 4/2016 | Leung et al. | |
| 2016/0188103 A1 | 6/2016 | Bernstein et al. | |
| 2016/0224238 A1 | 8/2016 | Rothkopf | |

OTHER PUBLICATIONS

European Search Report dated Dec. 13, 2017 issued in counterpart application No. 16194380.8-1879, 7 pages.
Summons to Attend Oral Proceedings dated May 29, 2018 issued in counterpart application No. 16194380.8-1221, 8 pages.

* cited by examiner

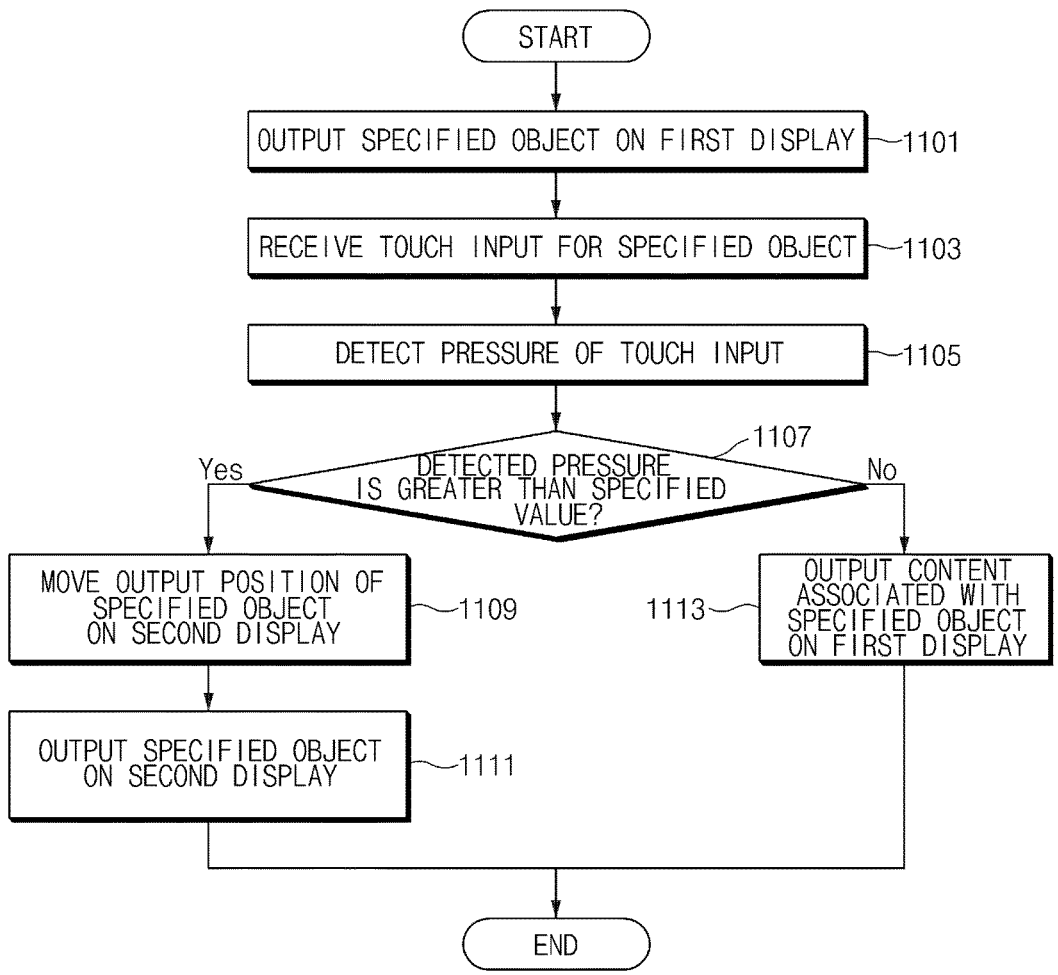

METHOD AND ELECTRONIC DEVICE FOR PROVIDING USER INTERFACE

PRIORITY

This application claims priority under 35 U.S.C. § 119(a) to a Korean Patent Application filed on Oct. 21, 2015, in the Korean Intellectual Property Office and assigned Serial No. 10-2015-0146707, the entire content of which is incorporated herein by reference.

BACKGROUND

1. Field of Disclosure

This disclosure relates generally to a user interface (UI) providing method and an electronic device performing the same based on the pressure of a touch input.

2. Description of the Related Art

With the development of mobile communication technologies, an electronic device equipped with a display, such as a smartphone, a wearable device, or the like, has been widely supplied since the spread of personal computers.

The display of the electronic device may be implemented with a touch screen by additionally using a resistive or capacitive touch panel. The display implemented with the touch screen may serve as an input device that receives a user manipulation, in addition to a visual display device.

According to various implementations, the touch screen may include a pressure sensor. The pressure sensor may sense the pressure of a physical user input (e.g., a touch input or the like) that is input to the electronic device. Accordingly, an electronic device including the above-mentioned touch screen may determine whether the user input is received with a pressure of a specific degree, as well as whether the user input is received.

Additionally, the electronic device may mount a plurality of touch screens described above. For example, a touch screen may be mounted on at least one of a top surface, a bottom surface, and a side surface of the electronic device.

SUMMARY

The present disclosure has been made to address at least the above-mentioned problems and/or disadvantages, and to provide at least the advantages described below.

Accordingly, an aspect of the present disclosure is to provide a method of providing a user with a new user interface (UI) and a user experience (UX) by including a plurality of touch screens each of which has a pressure sensor and an electronic device performing the same.

Accordingly, another aspect of the present disclosure is to provide an electronic device which outputs content on a first display or a second display based on the pressure of a touch input, so that a user may utilize a dual display of the electronic device intuitively.

In accordance with an aspect of the present disclosure, an electronic device includes a first display disposed on a first surface of the electronic device, a second display disposed on a second surface opposite to the first surface of the electronic device; and a processor. The processor outputs, on the first display, a specified object. The first display includes a display panel that displays the specified object, a touch panel that receives a touch input for the specified object, and a pressure sensor that senses a pressure of the touch input. The processor further outputs, on the second display, content associated with the touched specified object based on the pressure of the touch input.

In accordance with another aspect of the present disclosure, a user interface providing method of an electronic device includes outputting a specified object on a first display disposed on a first surface of the electronic device, receiving a touch input for the specified object, sensing a pressure of the touch input, and outputting content, which is associated with the specified object, on a second display disposed on a second surface opposite to the first surface of the electronic device, based on the pressure of the touch input.

In accordance with another aspect of the present disclosure, a computer-readable recording medium has recorded thereon an instruction performing the operations of outputting a specified object on a first display, disposed on a first surface of the electronic device, receiving a touch input for the specified object, sensing a pressure of the touch input, and outputting content, which is associated with the specified object, on a second display disposed on a second surface opposite to the first surface of the electronic device, based on the pressure of the touch input.

BRIEF DESCRIPTION OF THE DRAWINGS

The above and other aspects, features, and advantages of the present disclosure will be more apparent from the following detailed description taken in conjunction with the accompanying drawings, in which:

FIG. 11 is a flowchart of a UI providing method of an electronic device, according to an embodiment of the present disclosure;

DETAILED DESCRIPTION OF EMBODIMENTS OF THE PRESENT DISCLOSURE

Figure 1A:
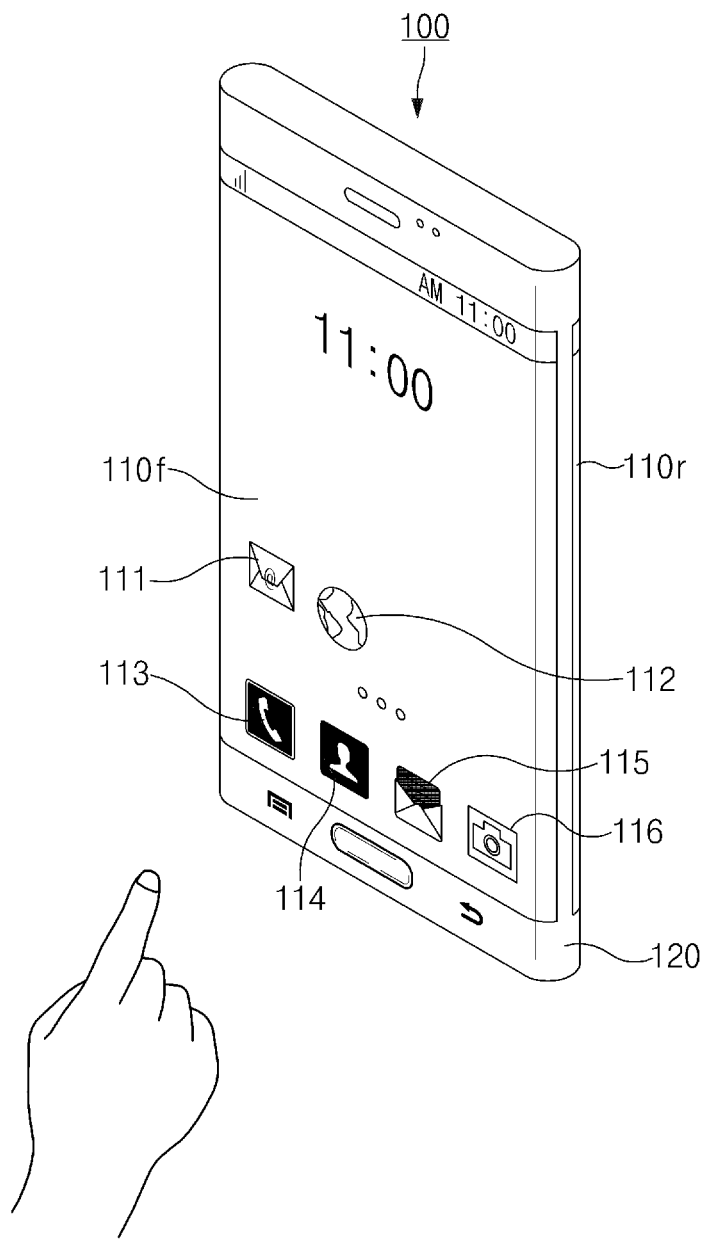
FIGS. 1A to 1C illustrate an electronic device, according to an embodiment of the present disclosure.

Various embodiments of the present disclosure may be described with reference to accompanying drawings. However, the embodiments described herein are not intended to limit the present disclosure to particular embodiments. Accordingly, those of ordinary skill in the art will recognize that various modifications, equivalents, and/or alternatives on the embodiments described herein can be made without departing from the scope and spirit of the present disclosure. With regard to description of drawings, similar components may be marked by similar reference numerals.

In the present disclosure, the expressions "have", "may have", "include" and "comprise", used herein, indicate the existence of corresponding features (e.g., elements such as numeric values, functions, operations, or components) but do not exclude the presence of additional features.

In the present disclosure, the expressions "A or B", "at least one of A or/and B", and "one or more of A or/and B", and the like used herein may include any and all combinations of one or more of the associated listed items. For example, the terms "A or B", "at least one of A and B", and "at least one of A or B" may refer to the case (1) where A is included, the case (2) where a B is included, or the case (3) where both A and B are included.

The terms, such as "first", "second", and the like used herein may refer to various elements of various embodiments of the present disclosure, but do not limit the elements. For example, "a first user device" and "a second user device" indicate different user devices regardless of the order or priority. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being (operatively or communicatively) "coupled" or "connected" with/to another element (e.g., a second element), the element may be directly coupled or connected to the other element or to an intervening element (e.g., a third element) may be present. In contrast, when an element (e.g., a first element) is referred to as being "directly coupled" or "directly connected" with/to another element (e.g., a second element), it should be understood that there is no intervening element (e.g., a third element) between the first and second elements.

According to the situation, the expression "configured to" used herein may be used interchangeably with, for example, the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein. In some cases, even if terms are defined in the specification, they should not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, or wearable devices. The wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to an embodiment, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA) device, a magnetic resonance imaging (MRI) device, a computed tomography (CT) device, scanners, and ultrasonic devices), navigation devices, global navigation satellite system (GNSS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), point of sales (POSs) devices, or Internet of Things devices (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, wave meters, and the like).

According to various embodiments, the electronic device may be one of the above-described devices or a combination thereof.

An electronic device according to an embodiment may be a flexible electronic device. Furthermore, an electronic device according to an embodiment may not be limited to the above-described electronic devices and may include other electronic devices and new electronic devices, according to the development of technologies.

Hereinafter, electronic devices according to various embodiments of the present disclosure will be described with reference to the accompanying drawings. The term "user" used herein may refer to a person who uses an electronic device or may refer to a device (e.g., an artificial intelligence electronic device) that uses an electronic device.

Figure 1B:
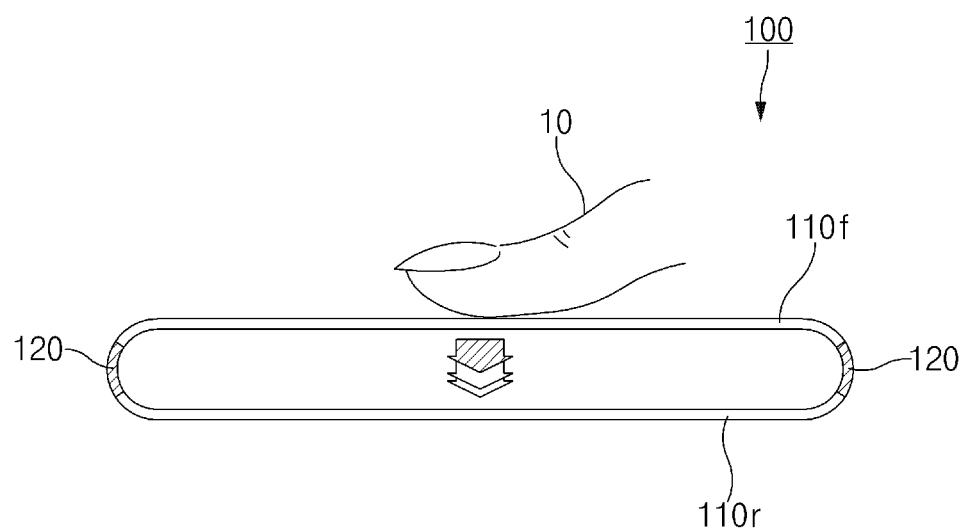
Figure 1C:
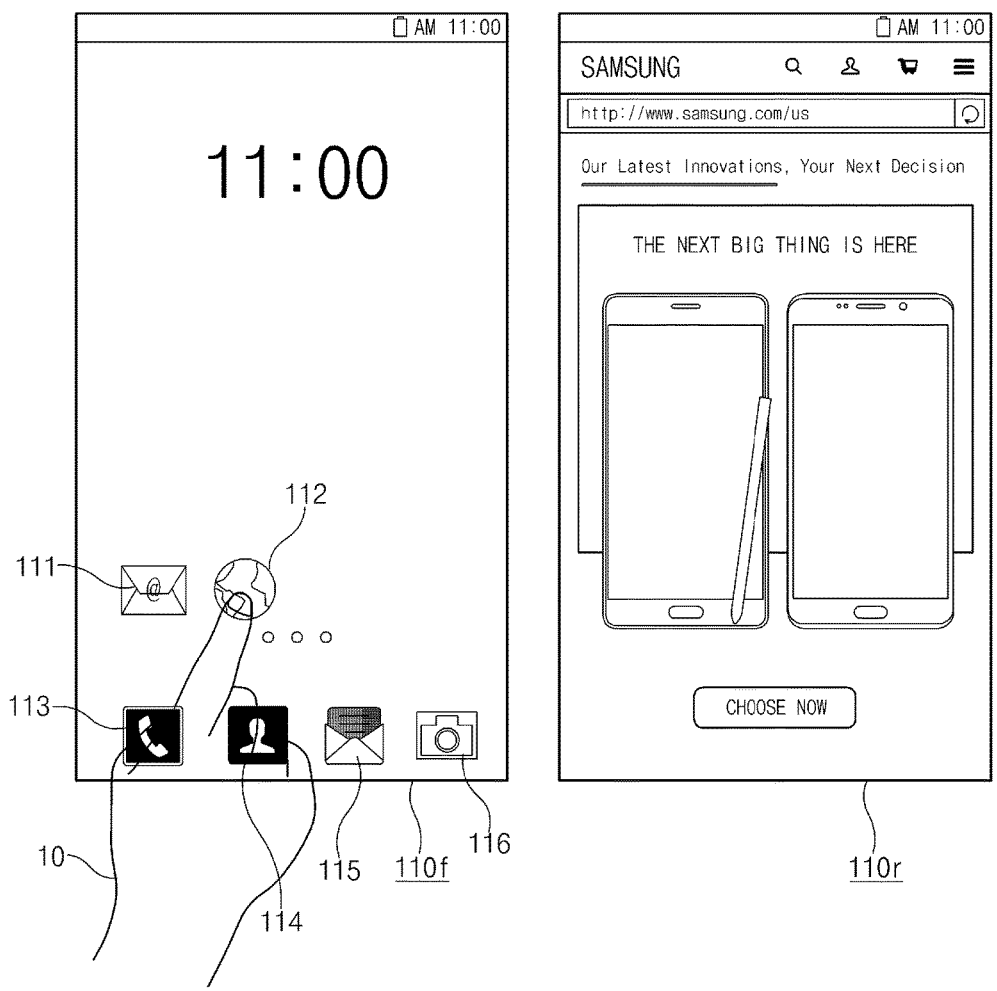

FIGS. 1A to 1C illustrate an electronic device, according to an embodiment of the present disclosure.

Referring to FIG. 1A, a perspective view of an electronic device 100 is illustrated. The electronic device 100 may outwardly include a first display 110f, a second display 110r, and a housing (or a case) 120.

According to an embodiment, the first display 110f may be disposed on a first surface of the electronic device 100, and the second display 110r may be disposed on a second surface of the electronic device 100 opposite to the first surface. It is described, herein, that the first surface may correspond to the front surface of the electronic device 100 and the second surface may correspond to the rear surface of the electronic device 100. Furthermore, the first display 110f and the second display 110r may be referred to as a "front display" and a "rear display", respectively. However, the front display and the rear display may be differently determined according to an embodiment. For example, the electronic device 100 may determine the rear surface as the first surface by using a gravity sensor, a gyro sensor, or the like that is embedded therein.

Each of the first display 110f and the second display 110r may output, for example, a variety of content (e.g., a text, an image, a video, an icon, a widget, a symbol, or the like). For example, the first display 110f may output objects (e.g., icons) 111 to 116 associated with various applications.

According to an embodiment, each of the first display 110f and the second display 110r may include a touch panel, a pressure sensor, a display panel, and the like and may receive, for example, a touch, a gesture, proximity, or a hovering input using an electronic pen or a portion of the body of a user (e.g., a finger). Each of the first display 110f and the second display 110r may include a configuration similar to (or substantially the same as) each other, and the configurations and operations thereof will be described in detail with reference to FIG. 3.

The housing 120 may be formed of plastic, glass, and/or metal to protect various elements in the electronic device 100 from an external shock or dust. According to various embodiments, at least a part of the housing 120 may be formed of metal. In the case where the side surface of the housing 120 is formed of metal, a so-called metal bezel may be implemented. The first display 110f may be disposed on or exposed through the first surface (e.g., front surface) of the housing 120, and the second display 110r may be disposed on or exposed through the second surface (e.g., rear surface) of the housing 120.

Referring to FIG. 1B, a sectional view of the electronic device 100 is illustrated. For example, FIG. 1B corresponds to a sectional view of a central portion of the electronic device 100 illustrated in FIG. 1A, taken along a horizontal direction. The first display 110f and the second display 110r may be disposed on the front surface (the first surface) and the rear surface (the second surface) of the electronic device 100, respectively. Each of the first display 110f and the second display 110r may include a shape in which at least one side thereof is bent. Accordingly, the left and right side surfaces (i.e., the third surface that connects the first surface and the second surface) of the electronic device 100 may include a part of the housing 120 and at least a portion of the displays 110f and 110r.

The first display 110f (or the second display 110r) of the electronic device 100 may receive a touch input by using a finger 10 of a user. According to an embodiment, the first display 110f (or the second display 110r) may include a touch panel and a pressure sensor. Accordingly, the electronic device 100 may receive a touch input by the finger 10 of the user and may detect a pressure according to the touch input.

Referring to FIG. 1C, the first display 110f, disposed on the first surface of the electronic device 100, and the second display 110r, disposed on the second surface thereof are illustrated. The first display 110f may output objects, which are associated with various applications, on a home screen. For example, the first display 110f may output an icon 111 of an email application, an icon 112 of an Internet browser application, an icon 113 of a phone application, an icon 114 of contacts application, an icon 115 of a message application, and an icon 116 of a camera application.

A user may select one of objects (e.g., the application icons 111 to 116) associated with the various applications output on the first display 110f by using a user interface (UI) providing method according to an embodiment of the present disclosure. For example, the user may touch the icon 112 of the Internet browser application output on the first display 110f with a specified pressure by using the finger 10. The electronic device 100 may output the content (e.g., a web page or the like) of an application, which the icon 112 of the Internet browser application indicates, on the second display 110r disposed on the second surface in response to the touch and the pressure.

Figure 2A:
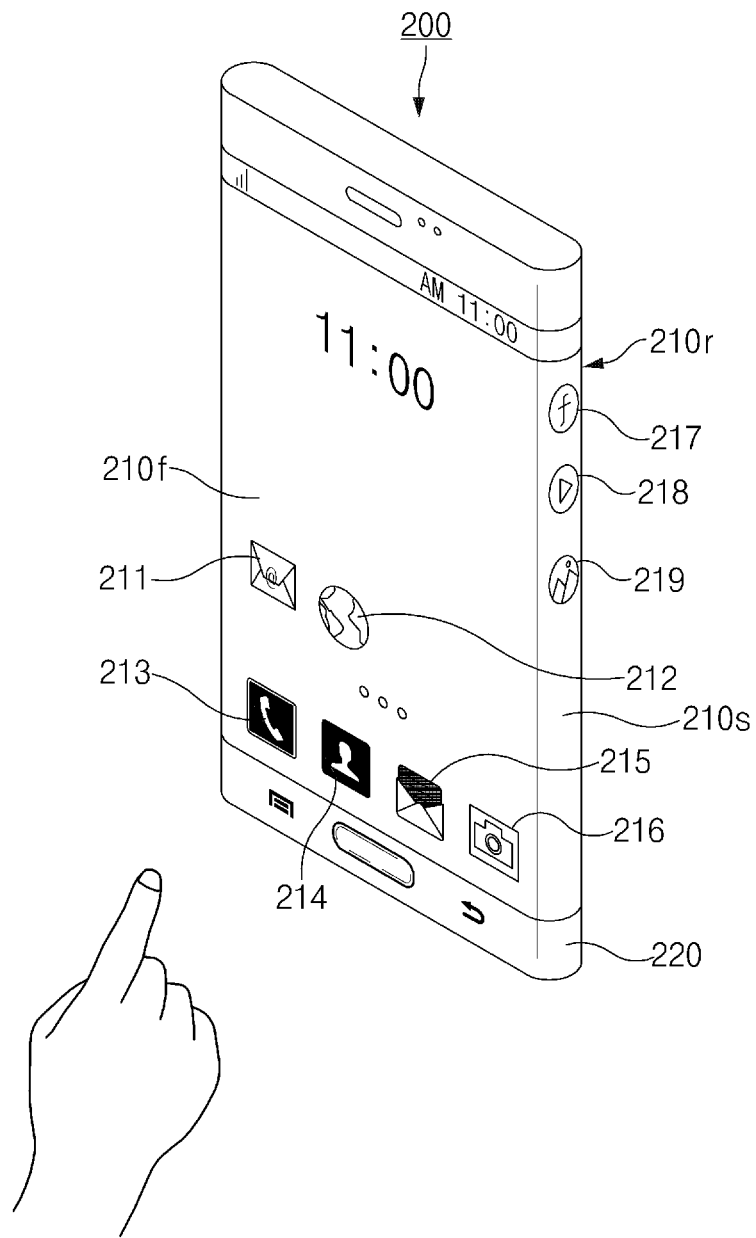
FIGS. 2A to 2C illustrate an electronic device, according to an embodiment of the present disclosure.
Figure 2B:
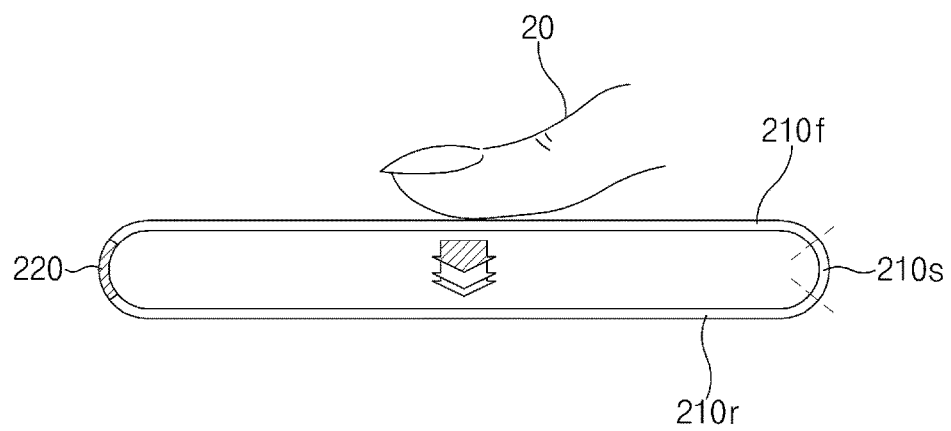
Figure 2C:
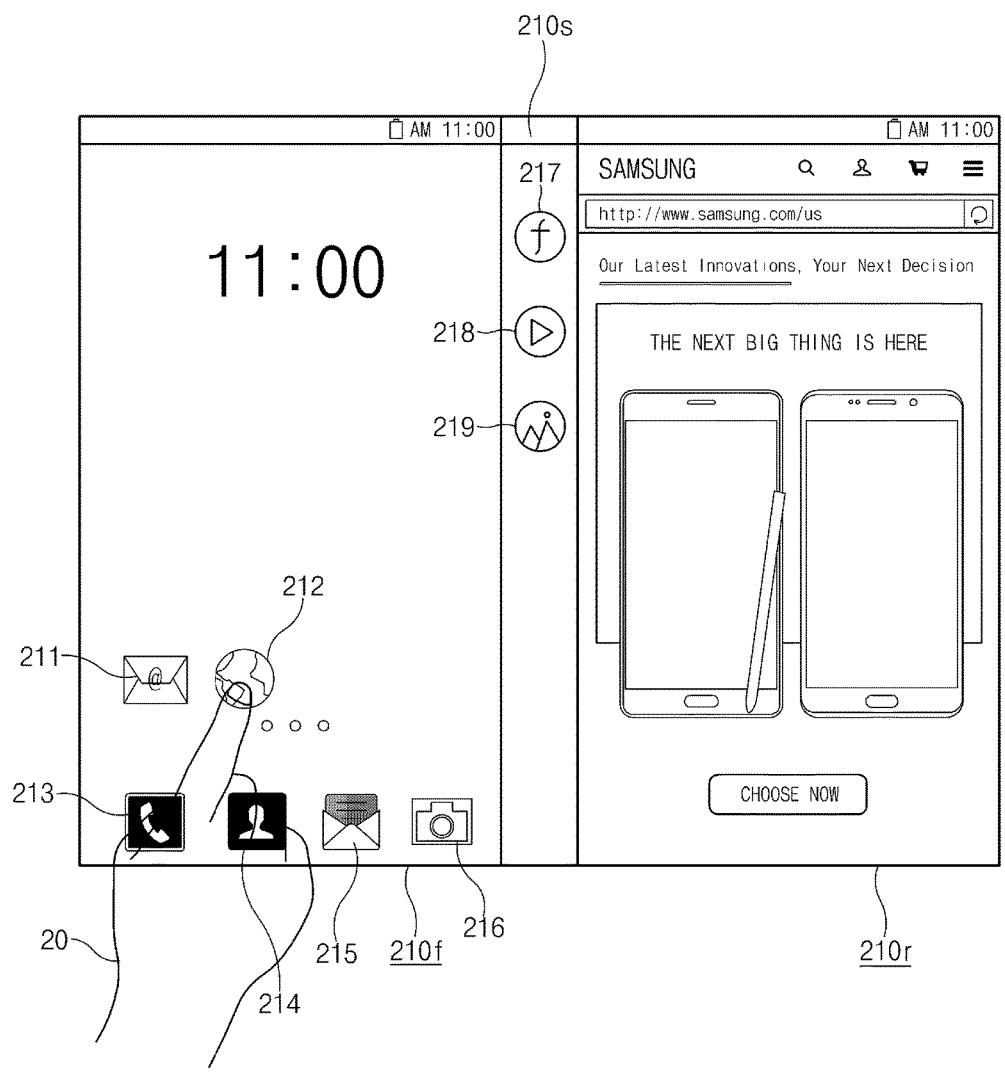

FIGS. 2A to 2C illustrate an electronic device, according to an embodiment of the present disclosure.

Referring to FIG. 2A, a perspective view of an electronic device 200 is illustrated. The electronic device 200 may outwardly include a first display 210f, a second display 210r, a third display 210s, and a housing (or a case) 220. In the description of the electronic device 200, the description of features similar to those described with respect to the electronic device 100 of FIGS. 1A to 1C will not be repeated here.

According to an embodiment, the first display 210f may be disposed on a first surface of the electronic device 200, and the second display 210r may be disposed on a second surface of the electronic device 200 opposite to the first surface. A third display 210s may be disposed on one side surface (the third surface) that connects the first surface and the second surface. For example, the first display 210f may correspond to the front display of the electronic device 200, the second display 210r may correspond to the rear display of the electronic device 200, and the third display 210s may correspond to the side surface display of the electronic device 200.

In addition, according to various embodiments, a fourth display may be disposed on another side surface (the fourth surface) that connects the first surface and the second surface. That is, displays may be respectively disposed on the front surface, the rear surface, the left-side surface, and the right-side surface of the electronic device 200.

As described herein, the first display 210f, second 210r, and third display 210s are described as independent display modules. However, a combination of at least two or more of the first display 210f, the second display 210r, and the third display 210s may be implemented with one display module.

For example, as illustrated in FIG. 2A, the first display 210f the second display 210r, and the third display 210s may be implemented with one display module (i.e., a wraparound display). In this case, each of the first display 210f, the second display 210r, and the third display 210s is not an independent module, and names thereof may be used simply to distinguish between the separate display areas.

The first display 210f, the second display 210r, and the third display 210s may output a variety of content. For example, the first display 210f may output objects (e.g., icons) 211 to 216 associated with various applications, and the third display 210s may output objects (e.g., icons) 217 to 219 associated with various applications. Also, according to an embodiment, each of the first display 210f, the second display 210r, and the third display 210s may include a touch panel, a pressure sensor, a display panel, and the like and may receive, for example, a touch, a gesture, proximity, or a hovering input using an electronic pen or a portion of the body of a user (e.g., finger).

As in the housing 120 of FIG. 1A, to protect various elements in the electronic device 200 from an external shock or dust, the housing 220 may be formed of plastic, glass, and/or metal.

Referring to FIG. 2B, a sectional view of the electronic device 200 is illustrated. For example, FIG. 2B corresponds a sectional view of a central portion of the electronic device 200 illustrated in FIG. 2A, taken along a horizontal direction. The first display 210f, the second display 210r, and the third display 210s may be disposed on the front surface (the first surface), the rear surface (the second surface), and one side surface (the third surface) of the electronic device 200, respectively.

As described above, the first display 210f, the second display 210r, and the third display 210s may be implemented with one display module. Accordingly, the one display may be implemented with a shape that is bent in a "⊐" form. Accordingly, one side surface of the electronic device 200 may include a part of the housing 220.

The first display 210f (or the first display 210f, the second display 210r, or the third display 210s) may receive a touch input using a finger 20. The electronic device 200 may detect a pressure that is generated according to the touch input.

Referring to FIG. 2C, the first display 210f disposed on the first surface (a front surface), the second display 210r disposed on the second surface, and the third display 210s disposed on the third surface of the electronic device 200 are illustrated.

As in the first display 110f of FIG. 1C, the first display 210f of FIG. 2C may output objects (e.g., the application icons 211 to 216), which are associated with various applications, on a home screen.

Moreover, the third display 210s may output objects associated with various applications. For example, the third display 210s may output an icon 217 of a social network service (SNS) application, an icon 218 of a multimedia player application, and an icon 219 of an image viewer. As such, the screen of the third display 210s that displays objects associated with applications may be referred to as a side bar.

A user may select one of objects (e.g., the application icons 211 to 216) associated with the various applications output on the first display 210f by using a UI providing method according to various embodiments of the present disclosure. For example, the user may touch the icon 212 of the Internet browser application output on the first display 210f with a specified pressure by using a finger 20. The electronic device 200 may output the content (e.g., a web page or the like) of an application, which indicates the icon 212 of the Internet browser application, on the second display 210r disposed on the second surface in response to the touch and the pressure.

Figure 3:
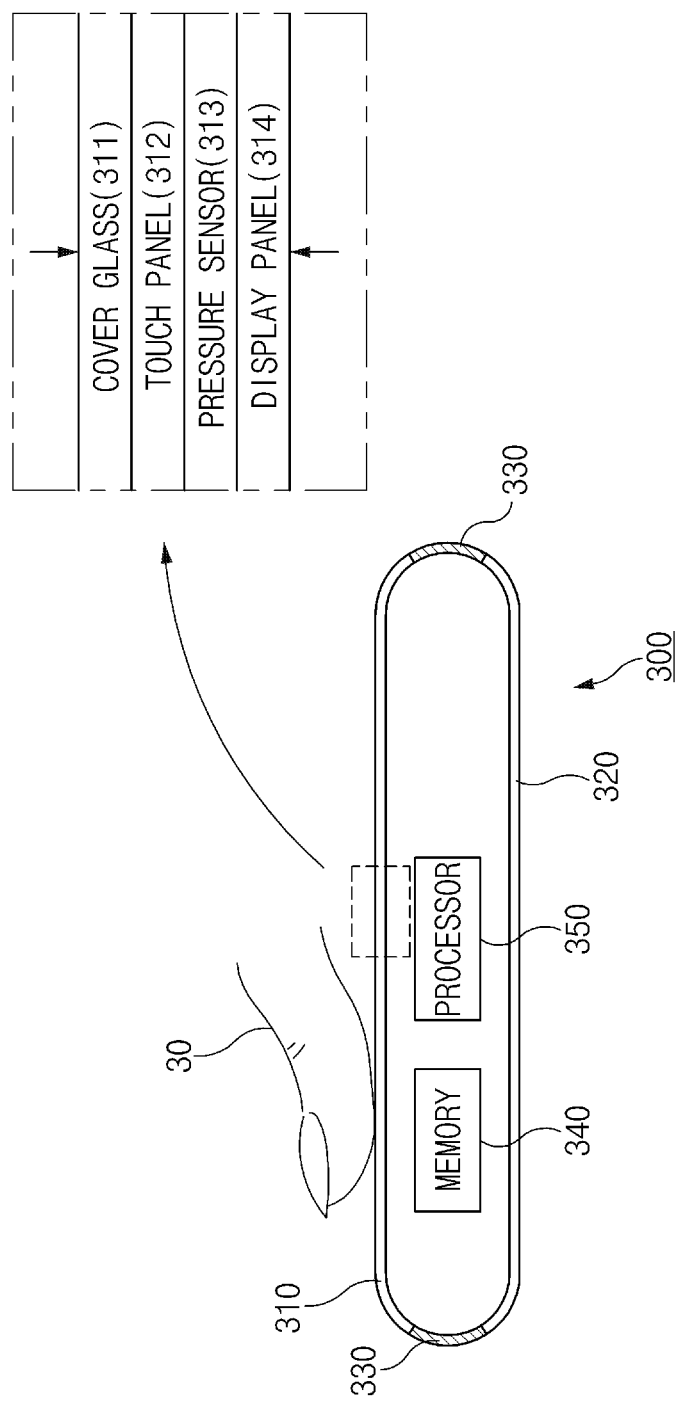
FIG. 3 is a block diagram of an electronic device, according to an embodiment of the present disclosure.

In FIGS. 1A to 1C and FIGS. 2A to 2C, implementation of an electronic device according to various embodiments of the present disclosure is described. Hereinafter, configurations and UI methods of the electronic device 100, according to various embodiments, will be described. FIG. 3 is a block diagram of an electronic device, according to an embodiment of the present disclosure.

Referring to FIG. 3, an electronic device 300 is provided. The electronic device 300 may include a first display 310, a second display 320, a housing 330, a memory 340, and a processor 350. According to various embodiments, the electronic device 300 may additionally include various modules which are not illustrated in FIG. 3 (e.g., see, FIG. 13 or 14). In addition, with regard features described with respect to FIGS. 1A to 1C, and FIGS. 2A to 2C, a duplicated description will not be repeated here.

The first display 310 may be disposed on a first surface (e.g., the front surface) of the electronic device 300. The first display 310 may include, for example, a cover glass 311, a touch panel 312, a pressure sensor 313, and a display panel 314. For example, at least one of the cover glass 311, the touch panel 312, the pressure sensor 313, and the display panel 314 may be adhered to another element with optical clean adhesive (OCA).

A light generated by the display panel 314 may pass through the cover glass 311. A user may perform a touch input (including an input using an electronic pen) on the cover glass 311. The cover glass 311 may be formed of, for example, tempered glass, reinforced plastic, a flexible polymer material, or the like and may protect the first display 310 or the electronic device 300 from an external shock.

The touch panel 312 may receive a touch input for an object or the like output from the display panel 314. For example, the touch panel 312 may be disposed on the display panel 314 (i.e., an on-cell touch panel), or may be included in the display panel 314 (i.e., an in-cell touch panel). The touch panel 312 may use at least one of a capacitive method, a resistive method, an infrared method, and an ultrasonic detecting method.

The pressure sensor 313 may detect the pressure (or the force) of a touch input received from a user. For example, the pressure sensor 313 may detect the pressure of the touch input based on capacitance that varies according to the touch input of a user. As another example, the pressure sensor 313 may detect the pressure of the touch input by recognizing a contact area where a user performs the touch input. In FIG. 3, the pressure sensor 313 may be disposed between the touch panel 312 and the display panel 314. However, according to various embodiments, the pressure sensor 313 may be mounted on a portion of the back surface of the display panel 314.

The display panel 314 may output content (e.g., a text, an image, a video, an icon, a widget, a symbol, or the like). For example, the display panel 314 may output a specified object.

According to an embodiment, the object may correspond to an object associated with an application. The object associated with the application may include, for example, an icon/widget output on a home screen of the electronic device 300, a button for which the specified function is set by an application, or a notification object. The above-described objects are merely examples and may also include various objects to each of which a function is assigned by an application.

According to an embodiment, the object may correspond to an object linked to a web document file (e.g., a hypertext markup language (HTML) file or the like), a text file, an image file, or a video file. The object may include, for example, an icon, a hypertext, or a preview for the various types of files.

The display panel 314 may include, for example, a liquid crystal display (LCD) panel, a light-emitting diode (LED) display panel, an organic LED (OLED) display panel, a microelectromechanical systems (MEMS) display panel, or an electronic paper display panel.

The second display 320 may be disposed on a second surface of the electronic device 300 opposite to the first surface. The second display 320 may include a configuration which is the same as or similar to that of the first display 310.

To protect various elements in the electronic device 300 from an external shock or dust, the housing 330 may be formed of plastic, glass, and/or metal.

The memory 340 may include, for example, a volatile and/or nonvolatile memory. The memory 340 may store instructions or data associated with at least one other element(s) of the electronic device 300. For example, the memory 340 may store various instructions including an operation, which the processor 350 executes, when executed.

The processor 350 may include, for example, a communication processor (CP) or an application processor (AP). The processor 350 may control each of elements (e.g., the first display 310, the second display 320, the memory 340, and the like) of an electronic device and may execute or launch various applications.

According to various embodiments, the processor 350 may output content on the second display 320 based on the pressure of a touch input received from a user. The touch input may correspond to, for example, an input for an object output on the first display 310. In addition, the content may correspond to content associated with an object for which the touch input is performed.

For example, if the pressure of a touch input for the object is greater than or equal to a specified value (or greater than the specified value) (i.e., a pressure touch or a force touch), the processor 350 may output content associated with the object on the second display 320. On the other hand, for example, if the pressure of the touch input is less than the specified value (or less than or equal to the specified value) (i.e., a tap), the processor 350 may output the content on the first display 310.

According to an embodiment, if the touch input is received for an object associated with an application, the processor 350 may output content according to the execution of the application, on the first display 310 or the second display 320 based on the pressure of the touch input.

According to an embodiment, if the touch input is received for an object associated with various types of files (e.g., a web document file, a text file, an image file, a video file, or the like), the processor 350 may output content included in the file on the first display 310 or the second display 320 based on the pressure of the touch input.

According to various embodiments, the processor 350 may receive a "pressure touch" through the first display 310 and then may output the content on the second display 320 when the second display 320 is placed in the first surface (the front surface) (e.g., in the case where a user turns over the electronic device 300 to switch from the front surface to the rear surface). Generally, since the rear surface of the electronic device 300 is in contact with the palm of a user's hand that grips the electronic device 300, the electronic device 300 may output the content when the second display is placed on the first surface (the front surface), thereby preventing a touch input that the user does not intend.

According to various embodiments, if a touch input for an object output on the first display 310 is received, the processor 350 may change the size of content output on the second display 320 based on the pressure of the touch input. For example, the processor 350 may enlarge the output area of the content in response to an increase in the pressure of the touch input. Alternatively, the processor 350 may reduce the output area of the content in response to a decrease in the pressure of the touch input. In addition, for example, if the touch input is ceased due to the decrease in the pressure of the touch input, the processor 350 may stop the output of the content.

According to various embodiments, if a touch input for an object output on the first display 310 is received, the processor 350 may provide the content to an application running on the second display 320, based on the pressure of the touch input. At least a portion of the provided content may be output to a specified position on the second display 320.

For example, an object associated with an image file may be output on the first display 310, and a screen (e.g., an email writing screen) according to the execution of an email application may be output on the second display 320. If a touch input for the object is received, the processor 350 may provide an image file associated with the object to an email application based on the pressure of the touch input. The email application may attach, for example, the image file as an attached file and may output at least a portion (e.g., a preview, the file name of an image, or the like) of the image to a specified position on the second display 320.

According to various embodiments, if a touch input for an object output on the first display 310 is received, the processor 350 may move the object to a corresponding position on the second display 320 based on the pressure of the touch input. The position on the second display 320 may include, for example, a position on the second display 320, which corresponds to a vertically downward direction (i.e., a vertical direction passing through the electronic device 300 from the first display 310 to the second display 320) of the object output on the first display 310.

Figure 4:
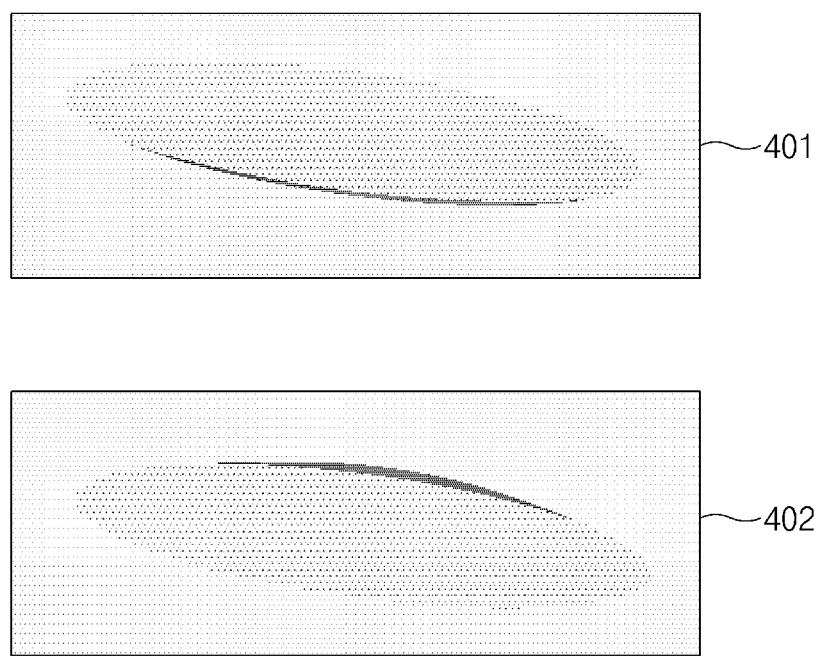
FIG. 4 illustrates a graphic effect of a touch input in an electronic device, according to an embodiment.

FIG. 4 illustrates a graphic effect of a touch input in an electronic device, according to an embodiment of the present disclosure;

Referring to FIG. 4, a first graphic effect 401 and a second graphic effect 402 are illustrated. According to various embodiments, the processor 350 may cause at least one of the first display 310 or the second display 320 to output a graphic effect corresponding to the pressure of a touch input to a position corresponding to the touch input.

For example, the first graphic effect 401 output on the first display 310 may include a shape that is concave in a direction in which the pressure of the touch input is applied. For example, a user may touch (or press) an object output on the first display 310. If the object is touched, a peripheral area of the object and the object on the first display 310 may be transformed to include a shape that is concave in a direction in which the pressure of the touch is applied.

Also, for example, the second graphic effect 402 output on the second display 320 may include a shape that is convex in a direction in which the pressure of the touch input is applied. For example, a user may touch (or press) an object output on the first display 310. If the object is touched, a position of the second display 320 (facing the first display 310) corresponding to the object and a peripheral area of the position corresponding to the object may be transformed to include a shape that is convex in a direction in which the pressure of the touch input is applied. The position of the second display 320, which corresponds to the object, may represent, for example, a position of the second display 320, which corresponds to a vertically downward direction (i.e., a vertical direction passing through the electronic device 300 from the first display 310 to the second display 320) of the object output on the first display 310.

Figure 5:
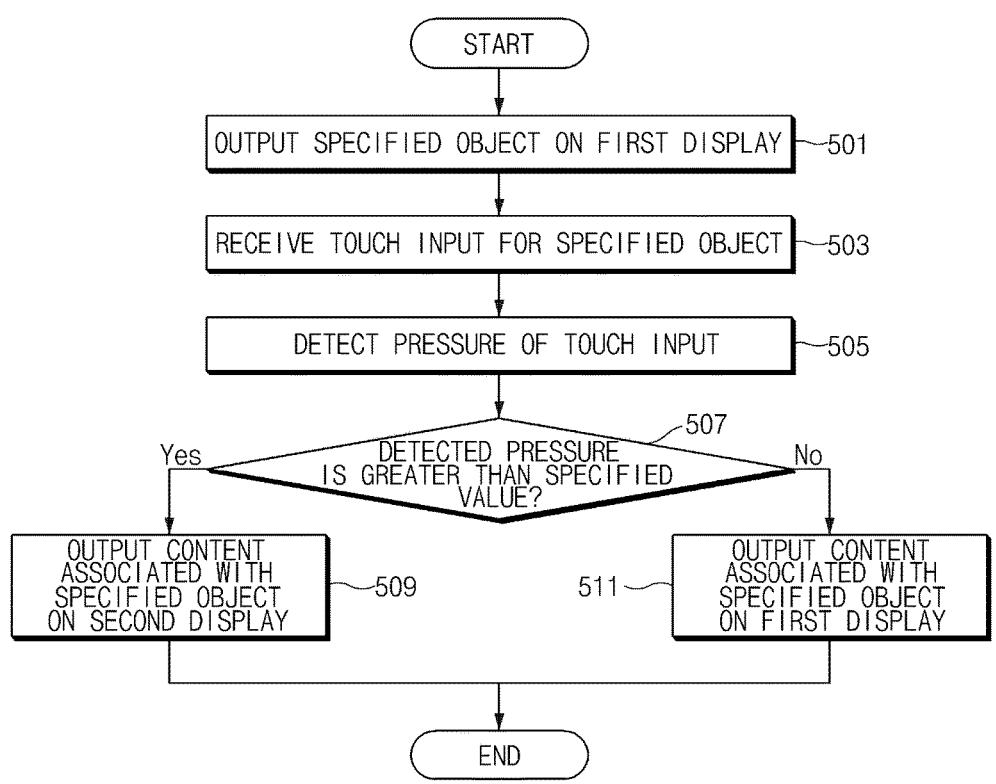
FIG. 5 is a flowchart of a user interface (UI) providing method of an electronic device, according to an embodiment of the present disclosure.

FIG. 5 is a flowchart of a UI providing method of an electronic device, according to an embodiment of the present disclosure.

Referring to FIG. 5, the UI providing method according to an embodiment may include operation 501 to operation 511. Operation 501 to operation 511 may be executed by, for example, the electronic device 100 illustrated in FIG. 1A, the electronic device 200 illustrated in FIG. 2A, or the electronic device 300 illustrated in FIG. 3. Hereinafter, operation 501 to operation 511 will be described with respect to the electronic device 300.

In operation 501, the processor 350 of the electronic device 300 may output a specified object on the first display 310 (of the display panel 314) disposed on a first surface (the front surface) of the electronic device 300. For example, the object may correspond to an object (e.g., an icon/widget, a notification object, or the like) associated with an application. As another example, the object may correspond to an object linked to a specified file (e.g., a web document file, a text file, an image file, a video file, or the like).

In operation 503, the touch panel 312 (of the first display panel 310) may receive a touch input for the specified object. The touch input may include a touch using a portion of the body of a user (e.g., a finger), contact using an electronic pen, a hovering input, or the like.

In operation 505, the pressure sensor 313 of the first display panel 310 may detect (or sense) a pressure (or a pressing force) of the touch input received in operation 503. According to an embodiment, operation 505 may be executed substantially in synchronization with operation 503.

In operation 507, the processor 350 of the electronic device 300 may determine whether the pressure of the touch input detected in operation 505 is greater than a specified value. For example, if the pressure of the touch input is greater than the specified value (or greater than or equal to the specified value), the processor 350 may proceed to operation 509 (in the case where the touch input is a "pressure touch"). On the other hand, if the pressure of the touch input is less than or equal to the specified value (or less than the specified value), the processor 350 may proceed to operation 511 (in the case where the touch input is a "tap").

When it is determined that the pressure of the touch input is greater than the specified value (determines that the touch input is a "pressure touch"), in operation 509, the processor 350 of the electronic device 300 may output content associated with an object, for which the touch input is received, on the second display 320 disposed on a second surface (the rear surface).

For example, the object for which the touch input is received may correspond to an object associated with an application. If the touch input for the object is greater than the specified value, the processor 350 may output content according to the execution of the application on the second display 320. That is, in the case where the touch input for an object is a "pressure touch", the processor 350 may execute the application on the rear display 320.

As another example, the object for which the touch input is received may correspond to an object linked to at least one of various types of files (e.g., a web document file, a text file, an image file, a video file, and the like). If the touch input for the object is greater than the specified value, the processor 350 may output content included in the various types of files on the second display 320. That is, in the case where the touch input for an object is a "pressure touch", the processor 350 may read the various types of files and play the read files on the rear display 320.

When it is determined that the pressure of the touch input is less than or equal to the specified value (determines that the touch input is a "tap"), in operation 511, the processor 350 of the electronic device 300 may output content associated with an object, for which the touch input is received, on the first display 310 disposed on the first surface (the front surface).

For example, the object for which the touch input is received may correspond to an object associated with an application. If the touch input for the object is less than the specified value, the processor 350 may output content according to the execution of the application on the first display 310. That is, in the case where the touch input for an object is a "tap", the processor 350 may execute the application on the front display 310.

As another example, the object for which the touch input is received may correspond to an object linked to at least one of various types of files (e.g., a web document file, a text file, an image file, a video file, and the like). If the touch input for the object is greater than the specified value, the processor 350 may output content included in the various types of files on the second display 320. That is, in the case where the touch input for an object is a "tap", the processor 350 may read the various types of files and play the read files on the front display 310

According to various embodiments, the processor 350 of the electronic device 300 may determine whether the first display 310 and the second display 320 are disposed on the first surface (the front surface) or the second surface (the rear surface), by using an embedded gravity sensor, an embedded gyro sensor, or the like. Accordingly, the processor 350 may receive a "pressure touch" through the first display 310 and then may output the content on the second display 320 when the second display 320 is placed in the first surface (the front surface) (e.g., in the case where a user turns over the electronic device 300 to switch from the front surface to the rear surface).

Furthermore, according to various embodiments, the processor 350 of the electronic device 300 may cause at least one of the first display 310 or the second display 320 to output a graphic effect corresponding to the pressure of a touch input to a location corresponding to the touch input. For example, the first graphic effect 401 output on the first display 310 may include a shape that is concave in the direction in which the pressure of the touch input is applied. As another example, the second graphic effect 402 output on the second display 320 may include a shape that is convex in the direction in which the pressure of the touch input is applied.

According to an embodiment, the area on the display to which the graphic effect is applied may correspond to the intensity of the pressure detected in operation 505. For example, as the intensity of the pressure of a touch input increases, the area to which a graphic effect is applied may become larger.

Figure 6A:
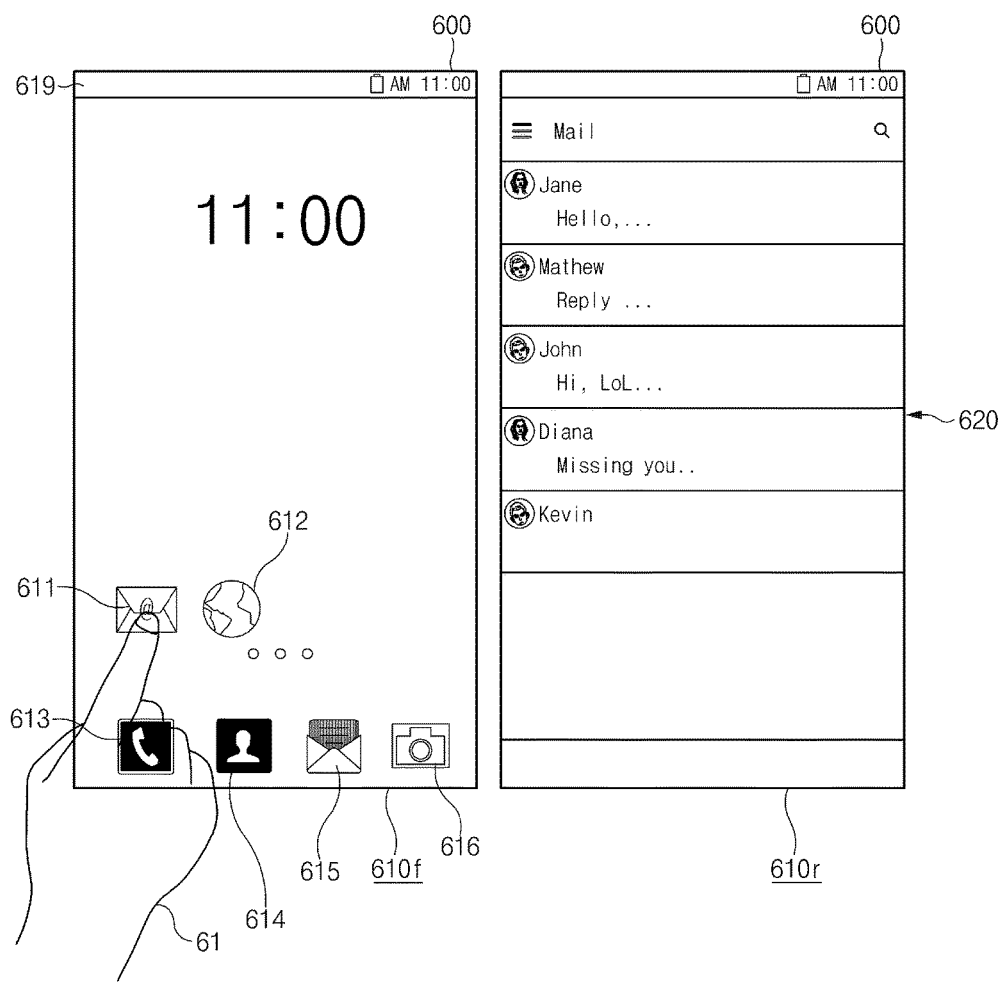
FIGS. 6A to 6C are views for describing a UI providing method of an electronic device, according to various embodiments of the present disclosure.
Figure 6B:
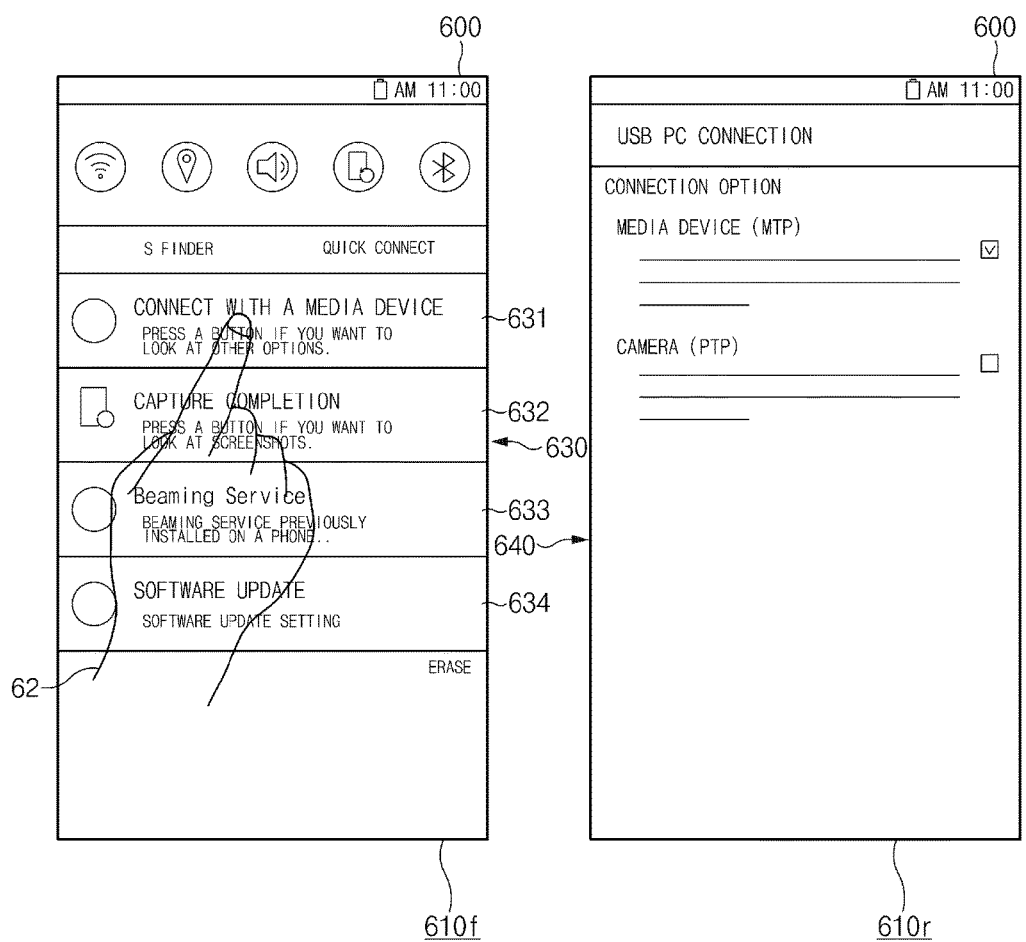
Figure 6C:
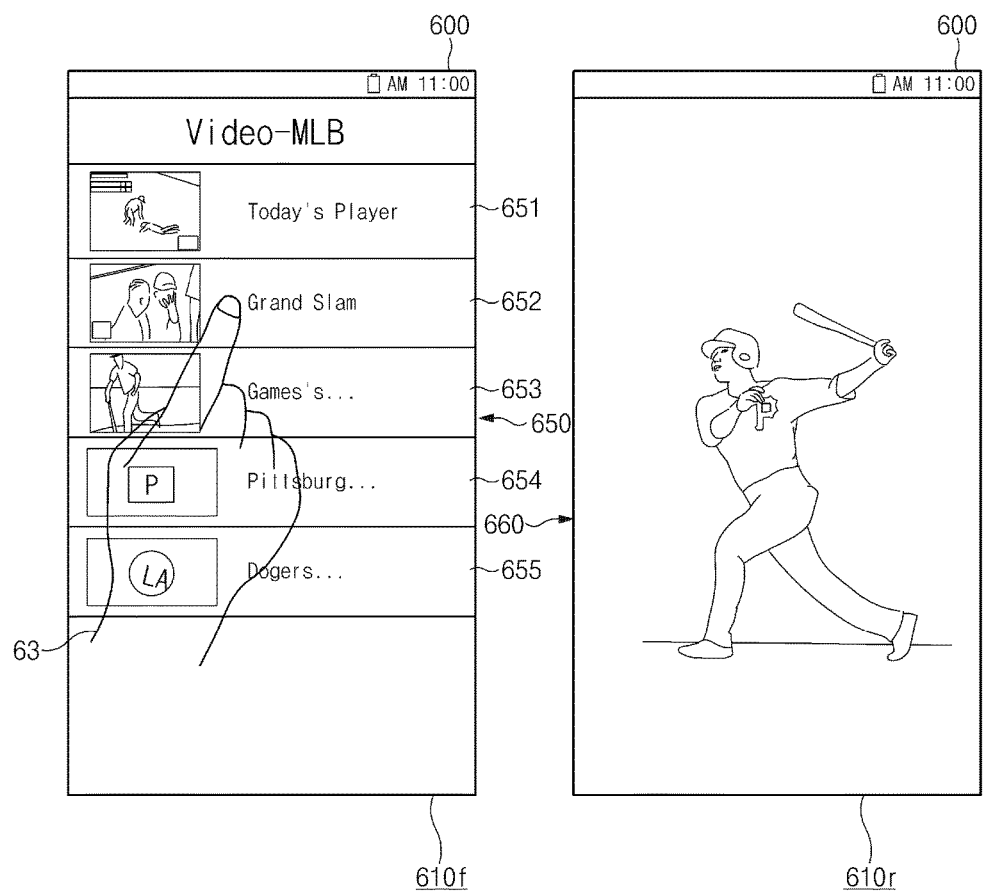

FIGS. 6A to 6C are views for describing a UI providing method of an electronic device, according to various embodiments.

Referring to FIG. 6A, a front display 610*f* and a rear display 610*r* of an electronic device 600 are illustrated. For example, the front display 610*f* and the rear display 610*r* may correspond to the first display 110*f* and the second display 110*r*, respectively, illustrated in FIG. 1A.

A status bar 619 and icons 611 to 616 of various applications may be output on the front display 610*f*. A user may touch the icon 611 of an email application by using a finger 61. If the finger 61 touches the icon 611 of the email application, for example, the electronic device 600 may execute the email application.

For example, if the intensity of the pressure (or the force) of the touch is greater than a specified value (in the case where a touch input is a "pressure touch"), the electronic device 600 may output content 620 (e.g., images, texts, and the like indicating received mails) according to the execution of the email application on the rear display 610*r*.

As another example, if the intensity of the pressure (or the force) of the touch is less than the specified value (in the case where a touch input is a "tap"), the electronic device 600 may output the content 620 according to the execution of the email application on the front display 610*f*.

Referring to FIG. 6B, the front display 610*f* and the rear display 610*r* of the electronic device 600 are illustrated.

A quick-panel 630 may be outputted on the front display 610*f*. For example, the quick-panel 630 may be created by touching the status bar 619 illustrated on the front display 610*f* of FIG. 6A and swiping downwards.

Various notification objects 631 to 634 may be included in the quick-panel 630. For example, the notification object 631 may correspond to an object for notifying a user of connection with a media device (e.g., an external device), the notification object 632 may correspond to an object for notifying the user of screenshot capture, the notification object 633 may be a notification object on the beam service of an electronic device, and the notification object 634 may correspond to an object for notifying the user of software update. For example, the user may touch the notification object 631 by using a finger 62. If the finger 62 touches the notification object 631, for example, the electronic device 600 may execute an application that sets connection with the media device.

For example, if the intensity of the pressure (or the force) of the touch is greater than a specified value (in the case where a touch input is a "pressure touch"), the electronic device 600 may output content 640 (e.g., a text or the like for setting a connection option with the media device) according to the execution of the application on the rear display 610*r*.

As another example, if the intensity of the pressure of the touch is less than the specified value (in the case where a touch input is a "tap"), the electronic device 600 may output the content 640 on the front display 610*f*.

Referring to FIG. 6C, the front display 610*f* and the rear display 610*r* of the electronic device 600 are illustrated.

According to an embodiment, the electronic device 600 may execute a multimedia player application and may display the executed screen on the front display 610*f*. Objects 651 to 655 linked to video files may be output on the front display 610*f*. Each of the objects 651 to 655 may include a preview and/or a title for a corresponding video file. For example, a user may touch the object 652 on "Grand Slam" by using a finger 63. If the finger 63 touches the object 652 on the "Grand Slam", for example, the electronic device 600 may play a video file linked to the object 652.

For example, if the intensity of the pressure (or the force) of the touch is greater than a specified value (in the case where a touch input is a "pressure touch"), the electronic device 600 may output (or play) content 660 (e.g., a video playback image on "Grand Slam") of the video file linked to the object 652 on the rear display 610*r*.

As another example, if the intensity of the pressure of the touch is less than the specified value (in the case where a touch input is a "tap"), the electronic device 600 may output the content 660 of the video file linked to the object 652 on the front display 610*f*.

According to various embodiments of the present disclosure, the electronic device 600 may output content on the first display (e.g., the front display) or the second display (e.g., the rear display) based on the pressure of a touch input. In the case where the pressure of the touch input is greater than a specified value, that is, in the case where a "pressure touch" is performed, the electronic device 600 may output the content on the rear surface. In the case where the pressure of the touch input is less than the specified value, that is, in the case where a "tap" is performed, the electronic device 600 may output the content on the front surface. As such, a user may be provided with a new UI/UX for utilizing a front/rear display intuitively.

Figure 7:
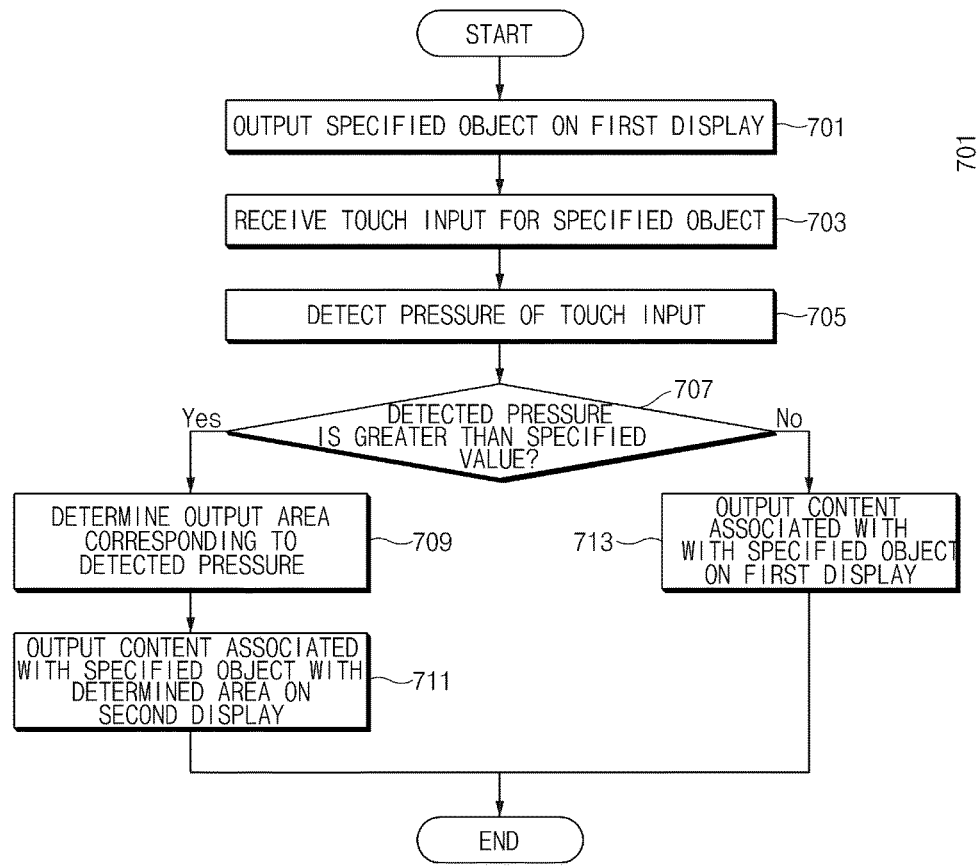
FIG. 7 is a flowchart of a UI providing method of an electronic device, according to an embodiment of the present disclosure.

FIG. 7 is a flowchart of a UI providing method of an electronic device, according to an embodiment of the present disclosure.

Referring to FIG. 7, the UI providing method according to an embodiment may include operation 701 to operation 713. Since operation 701 to operation 707 and operation 713 respectively correspond to operation 501 to operation 507 and operation 511 of FIG. 5, the duplicated description on the operations will not be repeated here. Hereinafter, the operation 709 and operation 711 will be described with reference to the electronic device 300.

In operation 709, since the processor 350 of the electronic device 300 determines that the pressure of a touch input is greater than a specified value (determines that the touch input is a "pressure touch"), the processor 350 may determine an output size (or area) of content that is output on the second display 320.

According to an embodiment, the processor 350 may adjust the size of content, which is output on the second display 320, based on the intensity of the pressure of the touch input detected in operation 705. For example, the processor 350 may enlarge the output area of the content in response to an increase in the pressure of the touch input or may reduce the output area of the content in response to a decrease in the pressure of the touch input.

In operation 711, the processor 350 may output content associated with an object, for which a touch input is performed, with the output area of the content, which is determined in operation 709, on the second display. According to various embodiments, the processor 350 may substantially execute operation 709 and operation 711 at the same time. That is, the size of the content output on the second display 320 may be adjusted in real time in response to the intensity of the pressure of the touch input.

Furthermore, according to various embodiments, while the content is output on the second display 320, if the touch input is ceased due to the decrease in the pressure of the touch input, the processor 350 may stop the output of the content.

Figure 8:
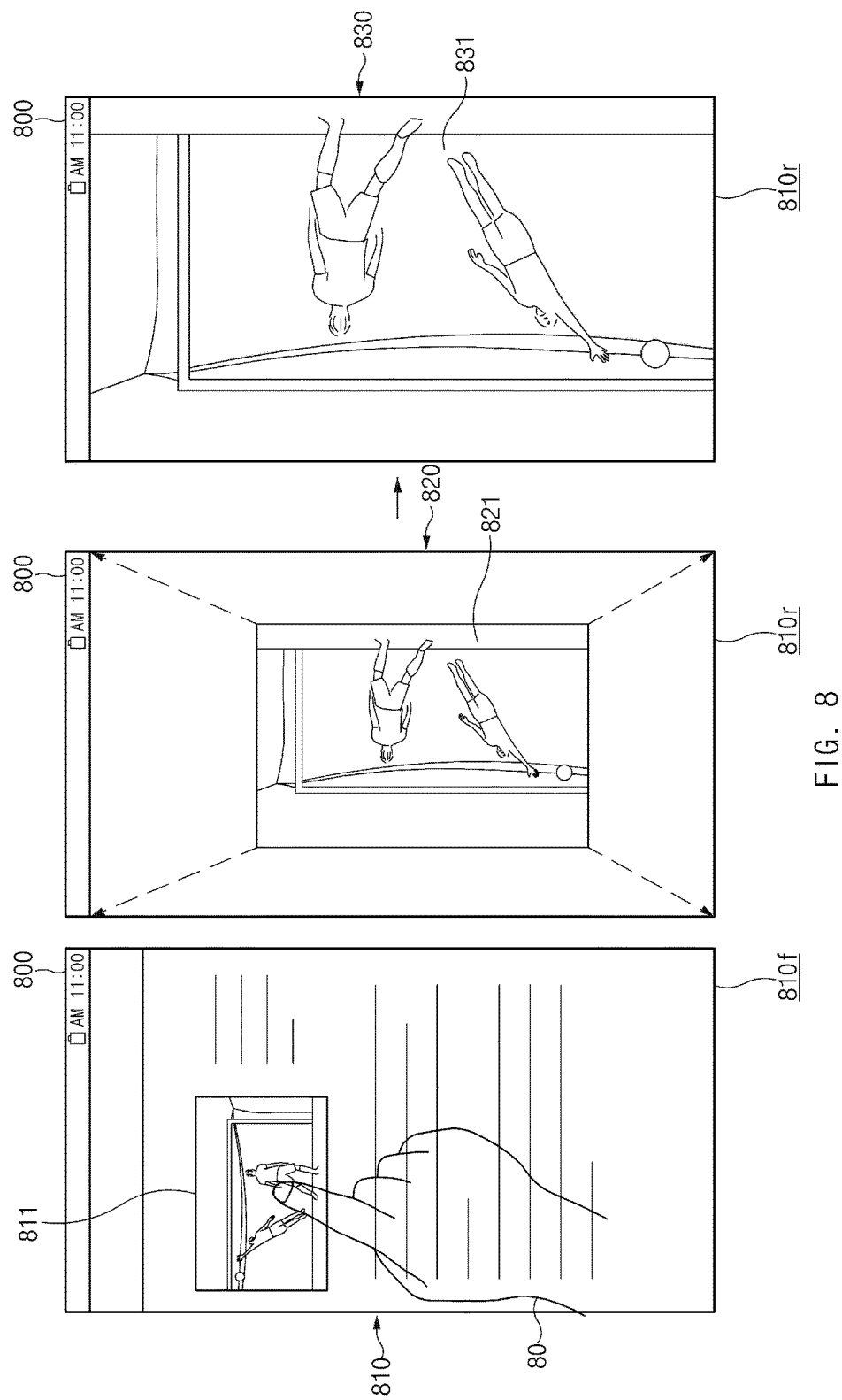
FIG. 8 is a view for describing a UI providing method of an electronic device, according to various embodiments of the present disclosure.

FIG. 8 is a view for describing a UI providing method of an electronic device, according to various embodiments of the present disclosure.

Referring to FIG. 8, a front display 810f and a rear display 810r of an electronic device 800 are illustrated. For example, the front display 810f and the rear display 810r may correspond to the first display 110f and the second display 110r, respectively, illustrated in FIG. 1A.

According to an embodiment, the electronic device 800 may execute an Internet browser application and may display a web page 810 according to the execution of the Internet browser application on the front display 810f. An object 811 linked to an image file may be included on the web page 810 displayed on the front display 810f. The objects 811 may include a preview for a corresponding image file. For example, a user may touch the object 811 by a finger 80.

If the intensity of the pressure (or the force) of the touch is greater than a specified value (in the case where a touch input is a "pressure touch"), the electronic device 800 may output an image 821 (content) of an image file, which is linked to the object 811, on the rear display 810r. For example, the content 821 may be included on an execution screen 820 of an image viewer application.

The electronic device 800 may adjust the size of the image 821, which is output on the rear display 810r, based on the pressure of the touch input. For example, if a user increases the intensity of the pressure of the touch input, the electronic device 800 may enlarge the output area of the image 821 in response to the increase in the pressure of the touch input. On the other hand, if a user decreases the intensity of the pressure of the touch input, the electronic device 800 may reduce the output area of the image 821 in response to the decrease in the pressure of the touch input.

According to an embodiment, the electronic device 800 may stop the output of the image 821 if the touch input is ceased due to the decrease in the intensity of the pressure of the touch input. Furthermore, if the intensity reaches a specified maximum value due to the increase in the intensity of the pressure of the touch input, as illustrated in an execution screen 830 of an image viewer application, the electronic device 800 may output an image 831 on the rear display 810r in a full screen mode.

According to various embodiments of the present disclosure, the electronic device may adjust the size of content, which is output on the second display, in real time in response to the pressure of the touch input. As such, a user may be provided with a new UI/UX for utilizing a front/rear display intuitively.

Figure 9:
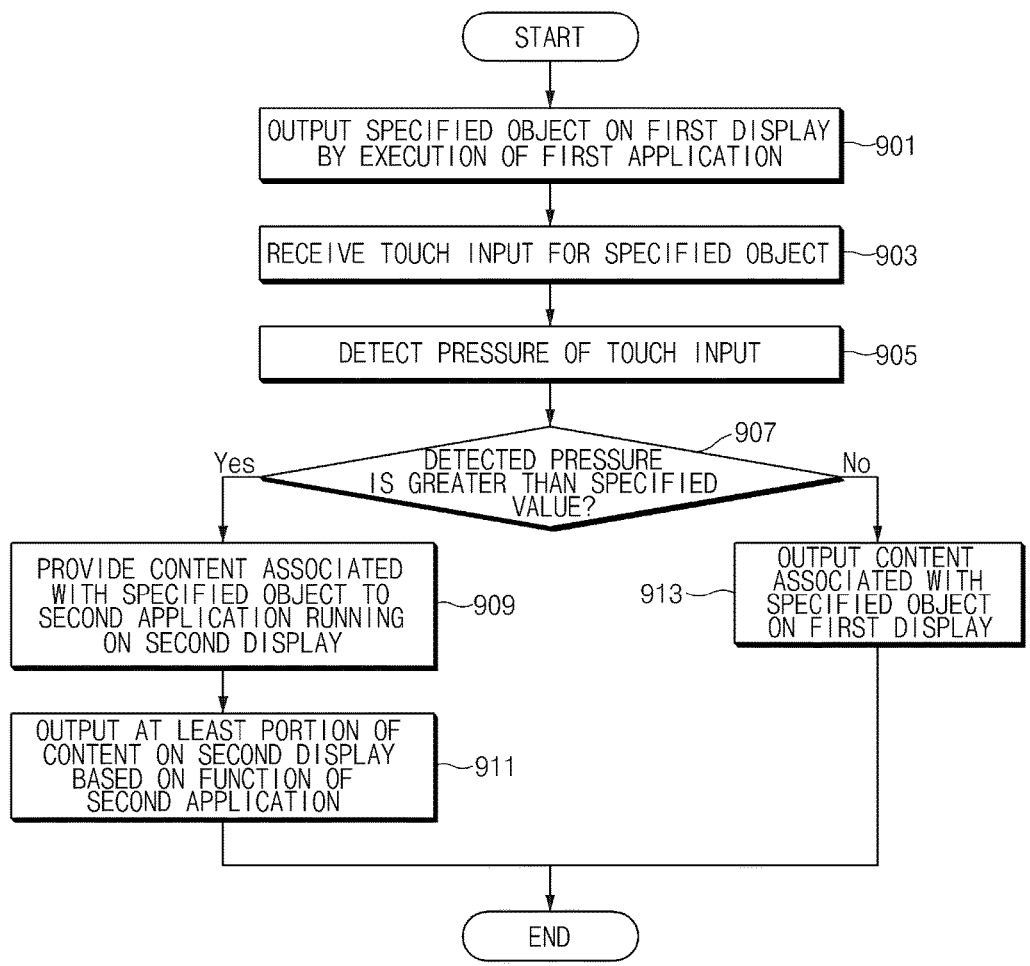
FIG. 9 is a flowchart of a UI providing method of an electronic device, according to an embodiment of the present disclosure.

FIG. 9 is a flowchart of a UI providing method of an electronic device, according to an embodiment of the present disclosure.

Referring to FIG. 9, the UI providing method may include operation 901 to operation 913. Since operation 901 to operation 907 and operation 913 correspond to operation 501 to operation 507 and operation 511, respectively, of FIG. 5, the duplicated description on the operations will not be repeated here. Hereinafter, operation 909 and operation 911 will be described by using the reference numeral of FIG. 3.

In operation 909, since the processor 350 of the electronic device 300 determines that the pressure of the touch input is greater than a specified value (determines that the touch input is a "pressure touch"), the processor 350 may provide content associated with an object (a specified object), for which the touch input is received, to an application running on the second display 320. For example, the application running on the second display 320 may receive the content as specified input information.

In operation 911, the processor 350 of the electronic device 300 may output at least a portion of the provided content to a specified position on the second display 320 based on the function of the application running on the second display 320. According to various embodiments, at least a portion of the content may not be output on the second display. In this case, operation 911 may be omitted.

Figure 10A:
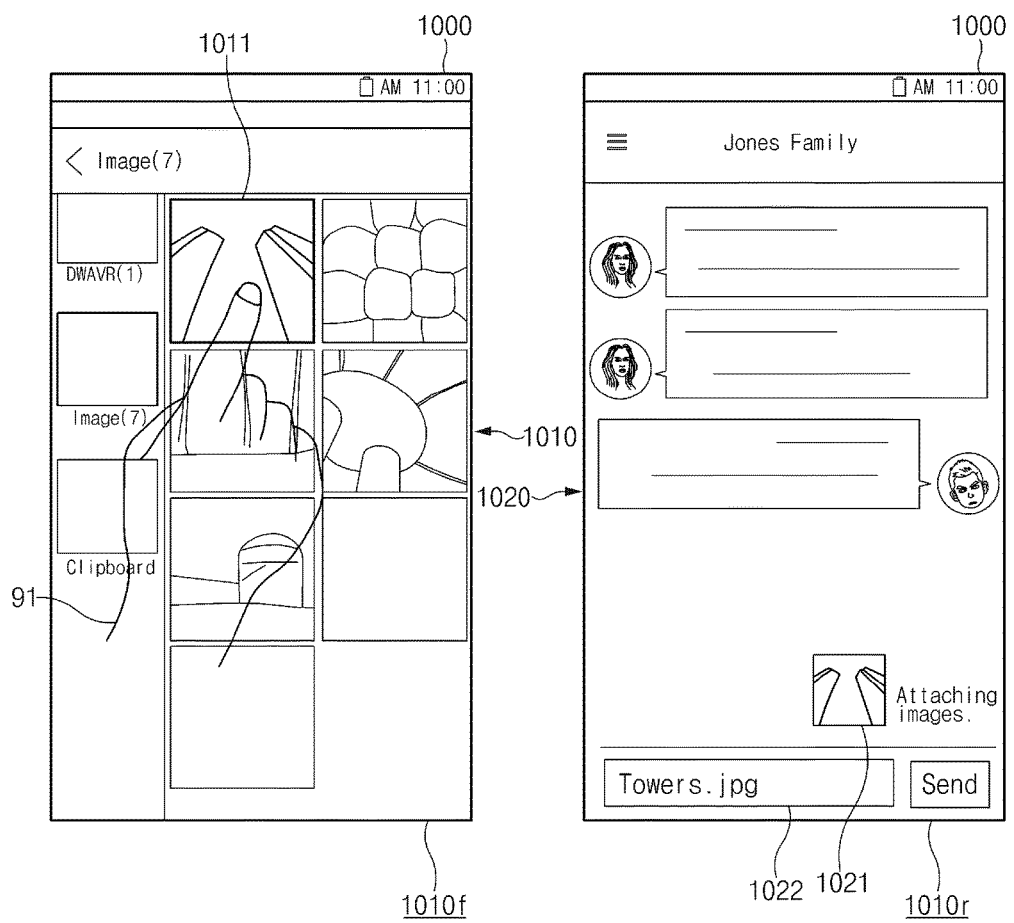
FIGS. 10A and 10B are views for describing a UI providing method, according to various embodiments of the present disclosure.
Figure 10B:
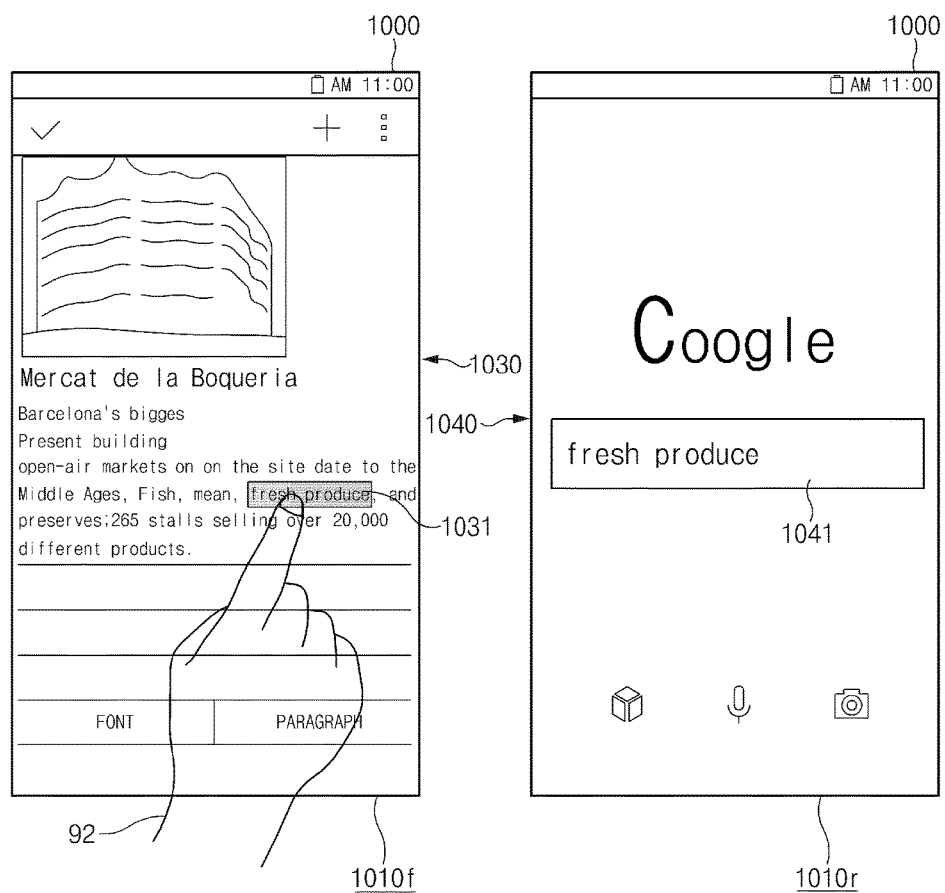

FIGS. 10A and 10B are views for describing a UI providing method of an electronic device, according to various embodiments.

Referring to FIG. 10A, a front display 1010f and a rear display 1010r of an electronic device 1000 are illustrated. For example, the front display 1010f and the rear display 1010r may correspond to the first display 110f and the second display 110r illustrated in FIG. 1A, respectively.

According to an embodiment, the electronic device 1000 may execute an image viewer application and may display a screen 1010 according to the execution of the image viewer application on the front display 1010f. Furthermore, the electronic device 1000 may execute an instant message (IM) application and may display a screen 1020 according to the execution of the IM application on the rear display 1010r.

A plurality of objects, to each of which an image file is linked, may be included on the screen 1010 displayed on the front display 1010f. The plurality of objects may include previews for image files, respectively. A chat window by the IM application may be included on the screen 1020 displayed on the rear display 1010r. For example, text messages exchanged between users and an input window 1022 for writing a message may be included on the chat window.

For example, a user may touch an object 1011 output on the front display 1010f by using a finger 91. If the intensity of the pressure (or the force) of the touch is greater than a specified value (in the case where a touch input is a "pressure touch"), the electronic device 1000 may provide content of an image file (file name: "Towers.jpg") linked to the object 1011 to the IM application running on the rear display 1010r. For example, the IM application may receive the image file (file name: "Towers.jpg") as specified input information. The IM application may attach the provided image file as an attached file to be sent to a chat counterpart.

According to various embodiments, the electronic device 1000 may output at least a portion of the provided content of the image file to a specified position on the rear display 1010r based on the function of the IM application. For example, the electronic device 1000 may send the provided image file to the chat counterpart based on the function of the IM application. The electronic device 1000 may output a preview 1021 of the provided content of the image file on an input field or a lower portion of the chat window. As another example, the electronic device 1000 may output the file name ("Towers.jpg") of the provided image file on the input window 1022.

Referring to FIG. 10B, the front display 1010f and the rear display 1010r of the electronic device 1000 are illustrated.

According to an embodiment, the electronic device 1000 may execute an Internet browser application and may display a web page 1030 according to the execution of the Internet browser application on the front display 1010f. Furthermore, the electronic device 1000 may execute an information search application and may display a screen 1040 according to the execution of the information search application on the rear display 1010r.

A plurality of objects such as an image, a text, and the like may be output on a web page 1030 displayed on the front display 1010f. A search window (or search field, query field) 1041 by the information search application may be included on the screen 1040 displayed on the rear display 1010r. For example, a text may be input on the search window 1041.

For example, a user may select a specified text on the web page 1030 output on the front display 1010f by using a finger 92. For example, the user may select text "fresh produce" on the web page 1030, and the selected text may be composed of one text object 1031. Moreover, the user may touch the object 1031 by the finger 92.

If the intensity of the pressure (or the force) of the touch is greater than the specified value (in the case where a touch input is a "pressure touch"), the electronic device 1000 may provide text content "fresh produce" included on the object 1031 to the information search application running on the rear display 1010r. For example, the information search application may receive the provided text content "fresh produce" as input information. The information search application may paste the provided text content "fresh produce" on the search window 1041.

According to various embodiments of the present disclosure, on the basis of the pressure of a touch input on the first display, the electronic device may provide content to an application running on the second display. As such, a user may conveniently perform interaction between applications running on the front display and the rear display intuitively.

FIG. 11 is a flowchart illustrating a UI providing method of an electronic device, according to an embodiment of the present disclosure.

Referring to FIG. 11, the UI providing method may include operation 1101 to operation 1113. Since operation 1101 to operation 1107 and operation 1113 correspond to operation 501 to operation 507 and operation 511, respectively, of FIG. 5, the duplicated description of the operations will not be repeated here. Hereinafter, operation 1109 and operation 1111 will be described by using the reference numeral of FIG. 3.

In operation 1109, since the processor 350 of the electronic device 300 determines that the pressure of the touch input is greater than a specified value (determines that the touch input is a "pressure touch"), the processor 350 may move an object (content) itself, for which a touch input is received, to the second display 320.

For example, the processor 350 may move the object, for which the touch input is received, to a corresponding position on the second display 320. The position on the second display 320 may include, for example, a position, which corresponds to a vertical downward direction (i.e., a direction vertically passing through the electronic device 300 from the first display 310 to the second display 320) of the object output on the first display 310, on the second display 320.

In operation 1111, the processor 350 of the electronic device 300 may output an object, which is moved in operation 1109, on the second display 320. According to an embodiment, operation 1111 may be substantially executed in synchronization with operation 1109.

Figure 12:
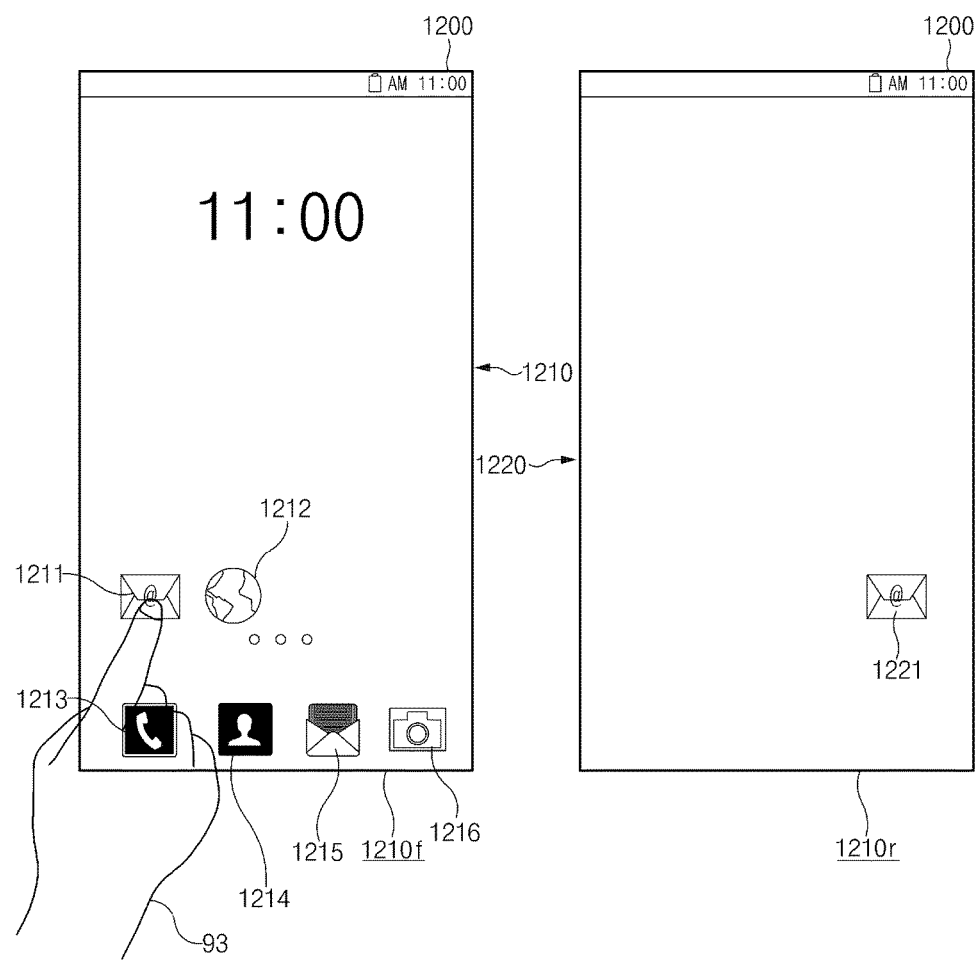
FIG. 12 is a view for describing a UI providing method of an electronic device, according to various embodiments of the present disclosure.

FIG. 12 is a view for describing a UI providing method of an electronic device, according to various embodiments.

Referring to FIG. 12, a front display 1210f and a rear display 1210r of an electronic device 1200 are illustrated. For example, the front display 1210f and the rear display 1210r may correspond to the first display 110f and the second display 110r, respectively, illustrated in FIG. 1A.

According to an embodiment, the electronic device 1200 may display a home screen 1210 of a front surface and a home screen 1220 of a rear surface on the front display 1210f and the rear display 1210r, respectively. For example, objects (e.g., application icons 1211 to 1216) associated with applications may be included on the home screen 1210 of the front surface displayed on the front display 1210f. Meanwhile, the home screen 1220 of a rear surface displayed on the rear display 1210r may have no objects output.

For example, a user may touch an email application icon 1211 output on the front display 1210f by using a finger 93. If the intensity of the pressure (or the force) of the touch is greater than a specified value (in the case where a touch input is "a pressure touch"), the electronic device 1200 may move the email application icon 1211 itself to the rear display 1210r.

For example, the email application icon 1211 may be moved to a position, which corresponds to a vertical downward direction of the front display 1210f on the rear display 1210r. In this case, a graphic effect such as a connection path may be added on the front display 1210f and/or the rear display 1210r in response to the pressure of the touch input. Alternatively, the electronic device 1200 may recognize a coordinate on the front display 1210f of the email application icon 1211, may rearrange the email application icon 1211 by using the recognized coordinate, and may apply the rearranged email application icon 1211 to the rear display 1210r.

As such, the email application icon 1211 output on the front display 1210f may be moved to an email application icon 1221 of the rear display 1210r.

According to various embodiments of the present disclosure, the electronic device may move an object output on the first display to the second display based on the pressure of a touch input on the first display. As such, a user may be provided with a new UI/UX for utilizing a front/rear display intuitively.

As described above, according to an embodiment of the present disclosure, an electronic device may include a first display disposed on a first surface of the electronic device, a second display disposed on a second surface of the electronic device opposite to the first surface, and a processor configured to control the first display and the second display. The first display may include a display panel that outputs a specified object, a touch panel that receives a touch input for the specified object, and a pressure sensor that senses a pressure of the touch input. The processor may be configured to output content associated with the specified object on the second display based on the pressure of the touch input.

In the electronic device according to an embodiment, the processor may be configured to output the content on the second display if the pressure of the touch input is greater than or equal to a specified value.

In the electronic device according to an embodiment, the processor is configured to output the content on the first display if the pressure of the touch input is less than a specified value.

In the electronic device according to an embodiment, the processor may be configured to adjust an output area of the content based on the pressure of the touch input.

In the electronic device according to an embodiment, the processor may be configured to enlarge the output area of the content in response to an increase in the pressure of the touch input.

In the electronic device according to an embodiment, the processor may be configured to reduce the output area of the content in response to a decrease in the pressure of the touch input.

In the electronic device according to an embodiment, the processor may be configured to stop an output of the content if the touch input is ceased due to the decrease in the pressure of the touch input.

In the electronic device according to an embodiment, the specified object may correspond to an object associated with an application. The content may include content according to execution of the application.

In the electronic device according to an embodiment, the specified object may correspond to an object linked to a web document file, a text file, an image file, or a video file. The content may include content included in the web document file, the text file, the image file or the video file.

In the electronic device according to an embodiment, the processor may be configured to move the specified object to a corresponding position on the second display based on the pressure of the touch input.

In the electronic device according to an embodiment, the processor may be configured to provide the content to an application running on the second display, based on the pressure of the touch input.

In the electronic device according to an embodiment, at least a portion of the provided content may be output to a specified position on the second display.

In the electronic device according to an embodiment, the processor may cause at least one of the first display and the second display to further output a graphic effect corresponding to the pressure of the touch input to a position corresponding to the touch input.

In the electronic device according to an embodiment, the graphic effect output on the first display may include a shape that is concave in a direction in which the pressure is applied.

In the electronic device according to an embodiment, the graphic effect output on the second display may include a shape that is convex in a direction in which the pressure is applied.

According to an embodiment of the present disclosure, a UI providing method of an electronic device may include outputting a specified object on a first display disposed on a first surface of the electronic device, receiving a touch input for the specified object, sensing a pressure of the touch input, and outputting content, which is associated with the specified object, on a second display disposed on a second surface of the electronic device opposite to the first surface based on the pressure of the touch input.

In the UI providing method according to an embodiment, the outputting may include adjusting an output area of the content based on the pressure of the touch input.

According to an embodiment, the UI providing method may further include providing the content to an application, which is running on the second display, based on the pressure of the touch input.

According to an embodiment, the UI providing method may further include outputting a graphic effect corresponding to the pressure of the touch input to a position corresponding to the touch input.

According to an embodiment, a computer-readable recording medium may have recorded thereon an instruction, which is executed by at least one processor, causing the processor to output a specified object on a first display disposed on a first surface of the electronic device, to receive a touch input for the specified object, to sense a pressure of the touch input, and to output content, which is associated with the specified object, on a second display disposed on a second surface of the electronic device opposite to the first surface based on the pressure of the touch input.

Figure 13:
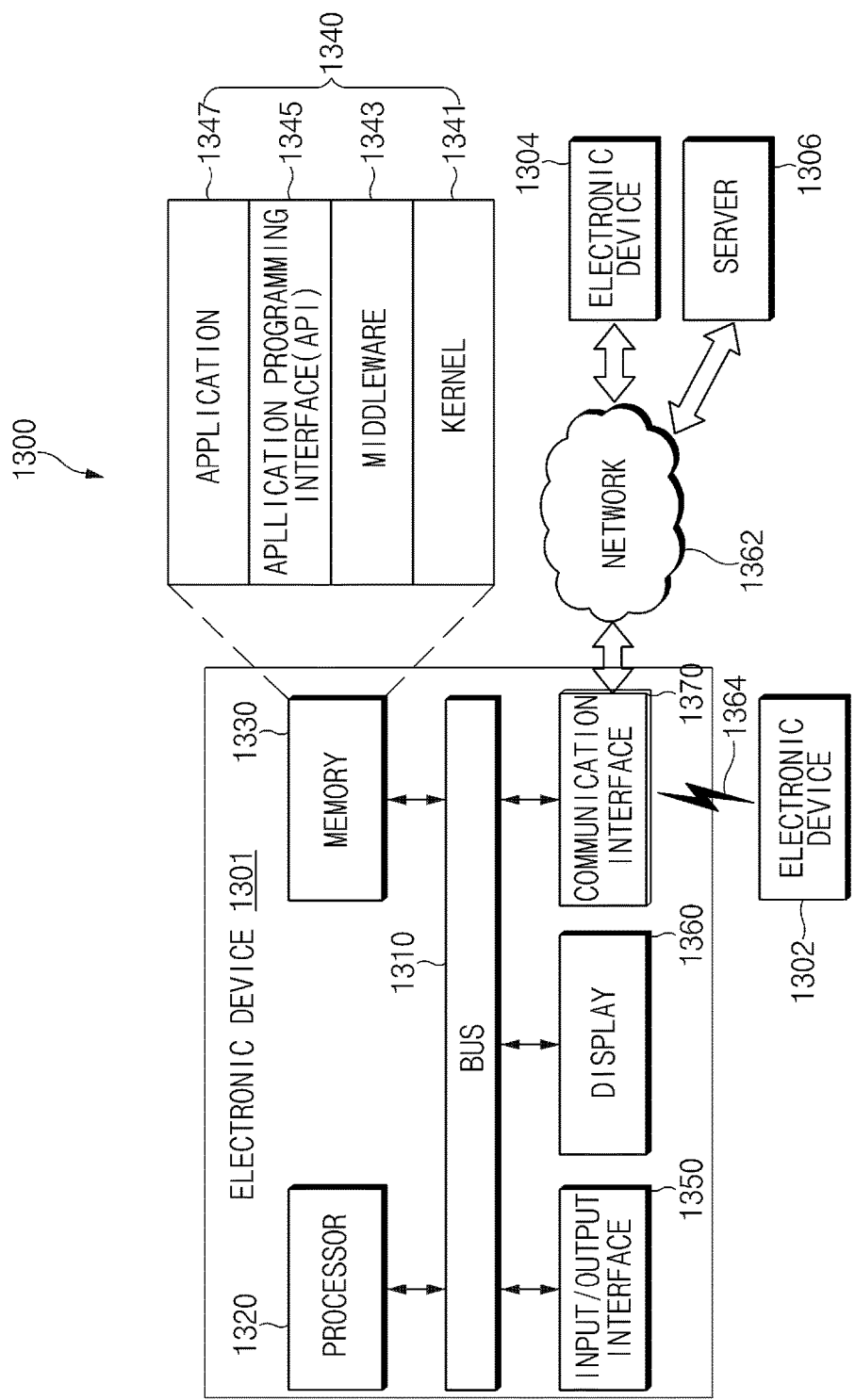
FIG. 13 illustrates a block diagram of an electronic device in a network environment, according to various embodiments of the present disclosure.

FIG. 13 illustrates a block diagram of an electronic device in a network environment, according to various embodiments.

Referring to FIG. 13, an electronic device 1301 in a network environment 1300 is provided. The electronic device 1301, a first external electronic device 1302, a second external electronic device 1304, and a server 1306 may be connected with each other through a network 1362 or a local area network 1364. The electronic device 1301 may include a bus 1310, a processor 1320, a memory 1330, an input/output interface 1350, a display 1360, and a communication interface 1370. According to an embodiment, the electronic device 1301 may omit at least one of the above-described elements or may further include other elements.

For example, the bus 1310 may interconnect the above-described elements 1310 to 1370 and may be a circuit for conveying communications (e.g., a control message and/or data) among the above-described elements.

The processor 1320 may include one or more of a central processing unit (CPU), an application processor (AP), or a communication processor (CP). For example, the processor 1320 may perform an arithmetic operation or data processing associated with control and/or communication of at least other elements of the electronic device 1301.

The memory 1330 may include a volatile and/or nonvolatile memory. The memory 1330 may store instructions or data associated with at least one other component of the electronic device 1301. The memory 1330 may store software and/or a program 1340. The program 1340 may include, for example, a kernel 1341, a middleware 1343, an application programming interface (API) 1345, and/or an application 1347. At least a part of the kernel 1341, the middleware 1343, or the API 1345 may be referred to as an "operating system (OS)".

The kernel 1341 may control or manage system resources (e.g., the bus 1310, the processor 1320, the memory 1330, and the like) that are used to execute operations or functions of other programs (e.g., the middleware 1343, the API 1345, and the application program 1347). Furthermore, the kernel 1341 may provide an interface that allows the middleware 1343, the API 1345, or the application 1347 to access discrete components of the electronic device 1301 so as to control or manage system resources.

The middleware 1343 may perform a mediation role such that the API 1345 or the application 1347 communicates with the kernel 1341 to exchange data.

Furthermore, the middleware 1343 may process task requests received from the application 1347 according to a priority. For example, the middleware 1343 may assign the priority, which makes it possible to use a system resource (e.g., the bus 1310, the processor 1320, the memory 1330, or the like) of the electronic device 1301, to at least one of the application 1347. For example, the middleware 1343 may process the one or more task requests according to the priority assigned to the at least one, which makes it possible to perform scheduling or load balancing on the one or more task requests.

The API 1345 may be an interface through which the application 1347 controls a function provided by the kernel 1341 or the middleware 1343, and may include, for example, at least one interface or function (e.g., an instruction) for a file control, a window control, image processing, a character control, or the like.

The I/O interface 1350 may transmit an instruction or data, input from a user or another external device, to other components of the electronic device 1301. Furthermore, the input/output interface 1350 may output an instruction or data, received from other component(s) of the electronic device 1301, to a user or another external device.

The display 1360 may include, for example, a liquid crystal display (LCD), a light-emitting diode (LED) display, an organic LED (OLED) display, or a microelectromechanical systems (MEMS) display, or an electronic paper display. The display 1360 may display, for example, various contents (e.g., a text, an image, a video, an icon, a symbol, and the like) to a user. The display 1360 may include a touch screen and may receive, for example, a touch, gesture, proximity, or a hovering input using an electronic pen or a part of a user's body.

The communication interface 1370 may establish communication between the electronic device 1301 and an external device (e.g., the first external electronic device 1302, the second external electronic device 1304, or the server 1306. For example, the communication interface 1370 may be connected to the network 1362 through wireless communication or wired communication to communicate with the external device (e.g., the second external electronic device 1304 or the server 1306).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like, as a cellular communication protocol. Furthermore, the wireless communication may include, for example, the local area network 1364. The local area network 1364 may include at least one of a Wi-Fi, a Bluetooth, a near field communication (NFC), a magnetic stripe transmission (MST), a global navigation satellite system (GNSS), or the like.

The MST may generate a pulse based on transmission data by using an electromagnetic signal, and the pulse may generate a magnetic field signal. The electronic device 1301 may send the magnetic field signal to point of sale (POS). The POS may detect the magnetic field signal using a MST reader and may recover the data by converting the detected magnetic field signal to an electrical signal.

The GNSS may include at least one of a global positioning system (GPS), a global navigation satellite system (Glonass), a Beidou Navigation Satellite System (Beidou), or a European global satellite-based navigation system (Galileo). Hereinafter, "GPS" and "GNSS" may be used interchangeably in this disclosure. The wired communication may include at least one of, for example, a universal serial bus (USB), a high definition multimedia interface (HDMI), a recommended standard 1432 (RS-232), a plain old telephone service (POTS), or the like. The network 1362 may include at least one of telecommunications networks, for example, a computer network (e.g., LAN or WAN), an Internet, or a telephone network.

Each of the first and second external electronic devices 1302 and 1304 may be a device of which the type is different from or the same as that of the electronic device 1301.

According to an embodiment, the server 1306 may include a group of one or more servers.

According to various embodiments, all or a part of operations that the electronic device 1301 will perform may be executed by one or more external devices (e.g., the electronic devices 1302 and 1304 or the server 1306). In the case where the electronic device 1301 executes any function or service automatically or in response to a request, the electronic device 1301 may not perform the function or the service internally, but, alternatively or additionally, the electronic device 1301 may request at least a part of a function associated with the electronic device 1301 from an external device (e.g., the electronic device 1302 or 1304 or the server 1306). The external device (e.g., the electronic device 1302 or 1304 or the server 1306) may execute the requested function or additional function and may send the execution result to the electronic device 1301. The electronic device 1301 may provide the requested function or service by using the received result or may additionally process the received result to provide the requested function or service. To this end, for example, cloud computing, distributed computing, or client-server computing may be used.

Figure 14:
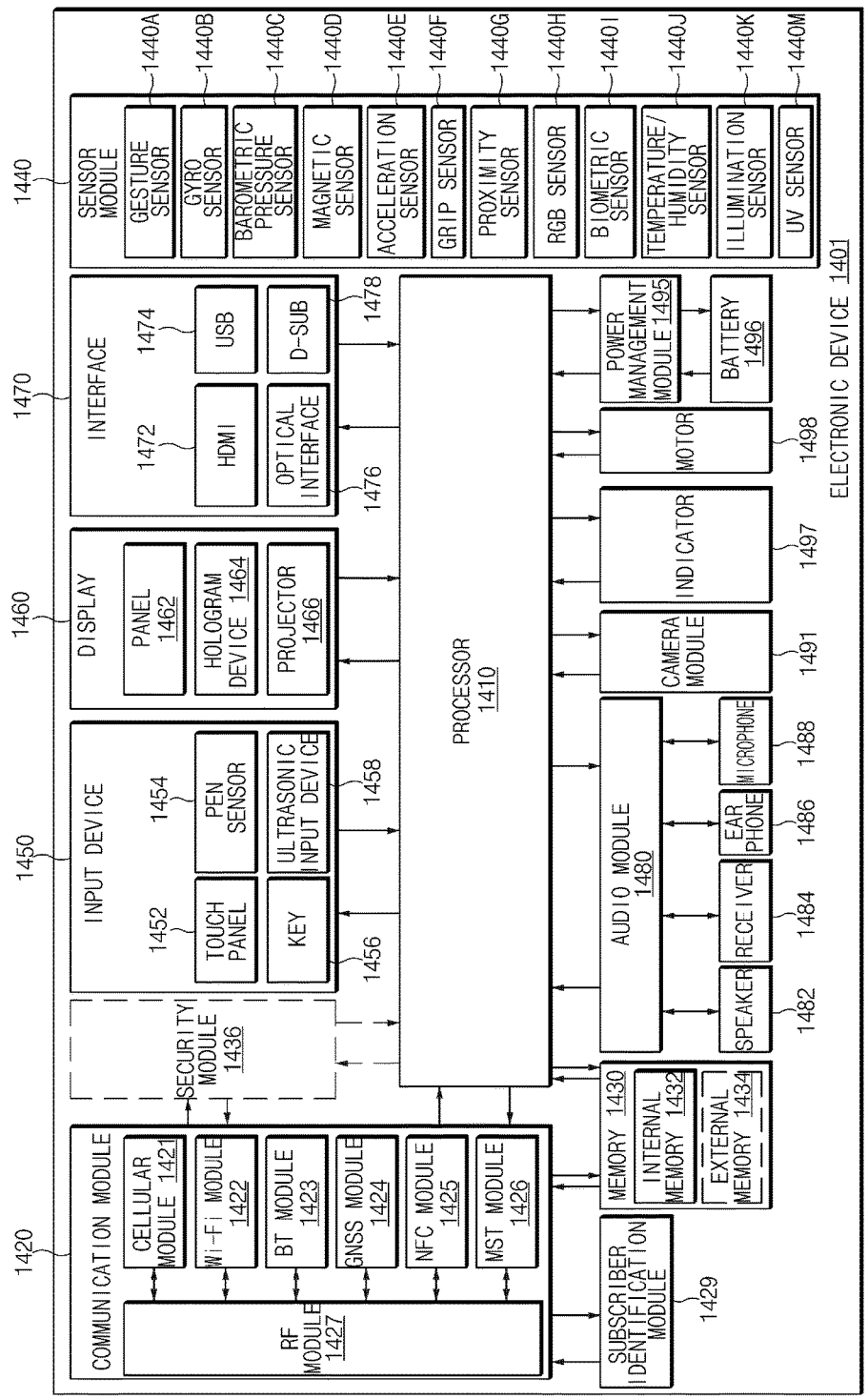
FIG. 14 illustrates a block diagram of a configuration of an electronic device, according to various embodiments of the present disclosure.

FIG. 14 illustrates a block diagram of a configuration of an electronic device according to various embodiments.

Referring to FIG. 14, the electronic device 1401 may include, for example, all or a part of the electronic device 1301 illustrated in FIG. 13. The electronic device 1401 may include one or more processors (e.g., an application processor) 1410, a communication module 1420, a subscriber identification module 1429, a memory 1430, a security module 1436, a sensor module 1440, an input device 1450, a display 1460, an interface 1470, an audio module 1480, a camera module 1491, a power management module 1495, a battery 1496, an indicator 1497, and a motor 1498.

The processor 1410 may drive an operating system (OS) or an application to control a plurality of hardware or software components connected to the processor 1410 and may process and compute a variety of data. For example, the processor 1410 may be implemented with a system on chip (SoC). According to an embodiment, the processor 1410 may further include a graphic processing unit (GPU) and/or an image signal processor. The processor 1410 may include at least a part (e.g., a cellular module 1421) of the other elements illustrated in FIG. 14. The processor 1410 may load and process an instruction or data, which is received from at least one of other elements (e.g., a nonvolatile memory), and may store a variety of data in a nonvolatile memory.

The communication module 1420 may be configured the same as or similar to the communication interface 1370 of FIG. 13. The communication module 1420 may include a cellular module 1421, a Wi-Fi module 1422, a Bluetooth (BT) module 1423, a GNSS module 1424 (e.g., a GPS module, a Glonass module, a Beidou module, or a Galileo module), a near field communication (NFC) module 1425, a magnetic stripe transmission (MST) module 1426, and a radio frequency (RF) module 1427.

The cellular module 1421 may provide voice communication, video communication, a character service, an Internet service, or the like through a communication network. According to an embodiment, the cellular module 1421 may perform authentication of the electronic device 1401 within a communication network by using the subscriber identification module 1429 (e.g., a SIM card). According to an embodiment, the cellular module 1421 may perform at least a portion of functions that the processor 1410 provides. According to an embodiment, the cellular module 1421 may include a communication processor (CP).

Each of the Wi-Fi module 1422, the BT module 1423, the GNSS module 1424, the NFC module 1425, or the MST module 1426 may include a processor for processing data exchanged through a corresponding module. According to various embodiments of the present disclosure, a combination of the cellular module 1421, the Wi-Fi module 1422, the BT module 1423, the GNSS module 1424, the NFC module 1425, or the MST module 1426 may be included within one integrated circuit (IC) or an IC package.

The RF module 1427 may send and receive a communication signal (e.g., an RF signal). For example, the RF module 1427 may include a transceiver, a power amplifier module (PAM), a frequency filter, a low noise amplifier (LNA), an antenna, or the like. According to another embodiment, at least one of the cellular module 1421, the Wi-Fi module 1422, the BT module 1423, the GNSS module 1424, the NFC module 1425, or the MST module 1426 may send and receive an RF signal through a separate RF module.

The subscriber identification module 1429 may include a SIM card or an embedded SIM, and may include unique identification information (e.g., integrated circuit card identifier (ICCID)) or subscriber information (e.g., integrated mobile subscriber identity (IMSI)).

The memory 1430 may include an embedded memory 1432 or an external memory 1434.

The internal memory 1432 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1434 may include a flash drive such as compact flash (CF), secure digital (SD), micro secure digital (Micro-SD), mini secure digital (Mini-SD), extreme digital (xD), a multimedia card (MMC), a memory stick, or the like. The external memory 1434 may be operatively and/or physically connected to the electronic device 1401 through various interfaces.

The security module 1436 may be a module that includes a storage space of which the security level is higher than that of the memory 1430 and may be a circuit that guarantees safe data storage and a protected execution environment. The security module 1436 may be implemented with a separate circuit and may include a separate processor. For example, the security module 1436 may be in a smart chip or a secure digital (SD) card, which is removable, or may include an embedded secure element (eSE) embedded in a fixed chip of the electronic device 1401. Furthermore, the security module 1436 may operate based on an operating system (OS) that is different from the OS of the electronic device 1401. For example, the security module 1436 may operate based on java card open platform (JCOP) OS.

The sensor module 1440 may measure, for example, a physical quantity or may detect an operation state of the electronic device 1401. The sensor module 1440 may convert the measured or detected information to an electric signal. For example, the sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, a proximity sensor 1440G, a red, green, blue (RGB) sensor 1440H, a biometric sensor 1440I, a temperature/humidity sensor 1440J, an illumination sensor 1440K, or an ultraviolet (UV) sensor 1440M. Additionally, the sensor module 1440 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 1440 may further include a control circuit that controls at least one or more sensors included therein.

According to an embodiment, the electronic device 1401 may further include a processor which is a part of the processor 1410 or independent of the processor 1410 and is configured to control the sensor module 1440. The processor may control the sensor module 1440 while the processor 810 remains at a sleep state.

The input device 1450 may include a touch panel 1452, a digital pen sensor 1454, a key 1456, or an ultrasonic input unit 1458. The touch panel 1452 may use at least one of capacitive, resistive, infrared and ultrasonic detecting methods. Also, the touch panel 1452 may further include a control circuit. The touch panel 1452 may further include a tactile layer to provide a tactile reaction to a user.

The digital pen sensor 1454 may be a part of a touch panel or may include an additional sheet for recognition.

The key 1456 may include, for example, a physical button, an optical key, a keypad, or the like.

The ultrasonic input device 1458 may detect or sense an ultrasonic signal, which is generated from an input device, through a microphone 1488 and may check data corresponding to the detected ultrasonic signal.

The display 1460 may include a panel 1462, a hologram device 1464, or a projector 1466.

The panel 1462 may be configured to be the same as or similar to the display 1360 illustrated in FIG. 13. The panel 1462 may be implemented, for example, to be flexible, transparent or wearable. The panel 1462 and the touch panel 1452 may be integrated into a single module.

The hologram device 1464 may display a stereoscopic image in the air by using a light interference phenomenon.

The projector 1466 may project light onto a screen so as to display an image. The screen may be arranged in the inside or the outside of the electronic device 1401.

According to an embodiment of the present disclosure, the display 1460 may further include a control circuit that controls the panel 1462, the hologram device 1464, or the projector 1466.

The interface 1470 may include a high-definition multimedia interface (HDMI) 1472, a universal serial bus (USB) 1474, an optical interface 1476, or a D-subminiature (D-sub) 1478. The interface 1470 may be included, for example, in the communication interface 1370 illustrated in FIG. 13. Additionally, the interface 1470 may include, for example, a mobile high definition link (MHL) interface, a SD card/multi-media card (MMC) interface, or an infrared data association (IrDA) standard interface.

The audio module 1480 may convert a sound and an electrical signal in dual directions. At least a part of the audio module 1480 may be included in the input/output interface 1350 illustrated in FIG. 13. The audio module 1480 may process sound information that is input or output through a speaker 1482, a receiver 1484, an earphone 1486, or the microphone 1488.

The camera module 1491 captures a still image or a video. The camera module 1491 may include, for example, at least one image sensor (e.g., a front sensor or a rear sensor), a lens, an image signal processor (ISP), or a flash (e.g., an LED or a xenon lamp).

The power management module 1495 may manage power of the electronic device 1401.

According to an embodiment, a power management integrated circuit (PMIC), a charger IC, or a battery gauge may be included in the power management module 1495.

The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure a remaining capacity of the battery 1496 and a voltage, current or temperature thereof while the battery is charged. The battery 1496 may include, for example, a rechargeable battery and/or a solar battery.

The indicator 1497 may display a specific state of the electronic device 1401 or a part thereof (e.g., the processor 1410), such as a booting state, a message state, a charging state, and the like.

The motor 1498 may convert an electrical signal into a mechanical vibration and may generate the following effects: vibration, haptic, and the like.

The electronic device 1401 may include a processing device (e.g., a GPU) that supports a mobile TV. The processing device that supports a mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 15:
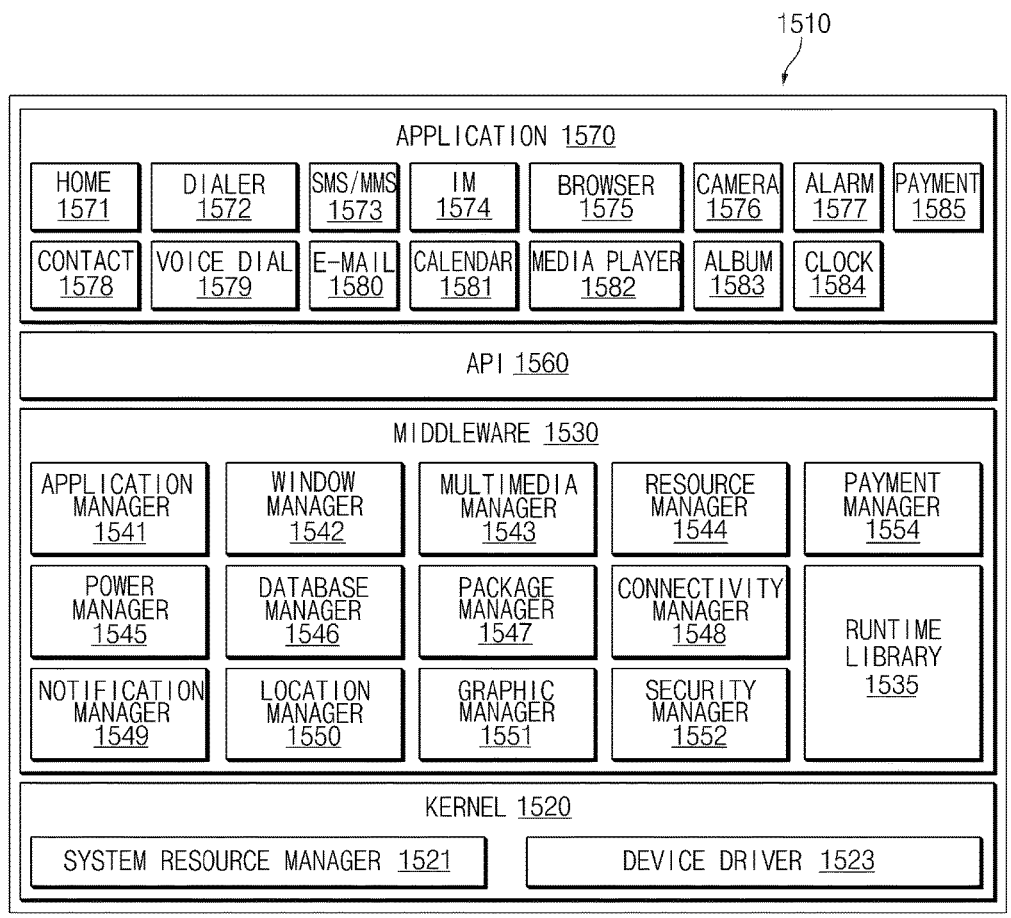
FIG. 15 illustrates a block diagram of a configuration a program module of an electronic device, according to various embodiments of the present disclosure.

FIG. 15 illustrates a block diagram of a configuration of a program module of an electronic device, according to various embodiments.

According to an embodiment, a program module 1510 may include an operating system (OS) to control resources associated with an electronic device (e.g., the electronic device 1301), and/or applications (e.g., the application program 1347) driven on the OS. The OS may be, for example, Android™, iOS™, Windows™, Symbian™, Tizen™, or Samsung Bada OS™.

The program module 1510 may include a kernel 1520, a middleware 1530, an application programming interface (API) 1560, and/or an application 1570. At least a part of the program module 1510 may be preloaded on the electronic device or may be downloadable from an external electronic device (e.g., the electronic device 1302 or 1304, the server 1306, and the like).

The kernel 1520 may include a system resource manager 1521, or a device driver 1523.

The system resource manager 1521 may perform control, allocation, or retrieval of system resources. According to an embodiment, the system resource manager 1521 may include a process managing unit, a memory managing unit, or a file system managing unit.

The device driver 1523 may include, for example, a display driver, a camera driver, a Bluetooth driver, a common memory driver, an USB driver, a keypad driver, a Wi-Fi driver, an audio driver, or an inter-process communication (IPC) driver.

The middleware 1530 may provide a function which the application 1570 needs in common, or may provide diverse functions to the application 1570 through the API 1560 to allow the application 1570 to efficiently use limited system resources of the electronic device. According to an embodiment, the middleware 1530 may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, or a security manager 1552, or a payment manager 1554.

The runtime library 1535 is a library module which is used by a compiler to add a new function through a programming language while the application 1570 is being executed. The runtime library 1535 may perform input/output management, memory management, or capacities about arithmetic functions.

The application manager 1541 may manage a life cycle of at least one application of the application 1570.

The window manager 1542 may manage a graphic user interface (GUI) resource which is used in a screen.

The multimedia manager 1543 may identify a format necessary for playing diverse media files, and may perform encoding or decoding of media files by using a codec suitable for the format.

The resource manager 1544 may manage resources such as a storage space, a memory, or a source code of at least one application of the application 1570.

The power manager 1545 may operate with a basic input/output system (BIOS) to manage a battery or power, and may provide power information for an operation of an electronic device.

The database manager 1546 may generate, search for, or modify a database which is to be used in at least one application of the application 1570.

The package manager 1547 may install or update an application that is distributed in the form of package file.

The connectivity manager 1548 may manage a wireless connection, such as Wi-Fi or Bluetooth.

The notification manager 1549 may display or notify of an event such as arrival message, promise, or proximity notification in a mode that does not disturb a user.

The location manager 1550 may manage location information of the electronic device.

The graphic manager 1551 may manage a graphic effect that is provided to a user, or manage a user interface relevant thereto.

The security manager 1552 may provide a general security function necessary for system security or user authentication.

According to an embodiment, in the case where an electronic device includes a telephony function, the middleware 1530 may further includes a telephony manager for managing a voice or video call function of the electronic device.

The middleware 1530 may include a middleware module that combines diverse functions of the above-described elements. The middleware 1530 may provide a module specialized for each kind of OS to provide differentiated functions. Additionally, the middleware 1530 may omit one or more of the existing elements, dynamically, or may add a new element thereto.

The API 1560 may be a set of programming functions and may be provided with a configuration which is variable depending on an OS. For example, in the case where an OS is Android™ or iOS™, it may provide one API set per platform. In the case where an OS is Tizen™, it may provide two or more API sets per platform.

The application 1570 may include, for example, one or more applications capable of providing functions for a home 1571, a dialer 1572, an SMS/MMS 1573, an instant message (IM) 1574, a browser 1575, a camera 1576, an alarm 1577, a contact 1578, a voice dial 1579, an e-mail 1580, a calendar 1581, a media player 1582, an album 1583, a clock 1584, a payment 1585, or for offering health care information (e.g., measuring an exercise quantity or blood sugar level) or environment information (e.g., atmospheric pressure, humidity, or temperature).

According to an embodiment of the present disclosure, the application 1570 may include an information exchanging application to support information exchange between the electronic device 1301 and an external electronic device (e.g., the electronic device 1302 or 1304).

The information exchanging application may include a notification relay application for transmitting specific information to the external electronic device, or a device management application for managing the external electronic device.

The information exchanging application may include a function of transmitting notification information, which arises from other applications (e.g., applications for SMS/MMS, e-mail, health care, or environmental information), to an external electronic device (e.g., the electronic device 1302 or 1304). Additionally, the information exchanging application may receive notification information from an external electronic device and provide the notification information to a user.

The device management application may manage (e.g., install, delete, or update) at least one function (e.g., turn-on/turn-off of an external electronic device itself (or a part of components) or adjustment of brightness or resolution of a display) of the external electronic device (e.g., the electronic device 1302 or 1304) which communicates with the electronic device, an application running in the external electronic device, or a service (e.g., a call service, a message service, or the like) provided from the external electronic device.

According to an embodiment, the application 1570 may include an application (e.g., a health care application) which is assigned in accordance with an attribute (e.g., an attribute of a mobile medical device as a kind of electronic device) of an external electronic device (e.g., the electronic device 1302 or 1304). The application 1570 may include an application which is received from an external electronic device (e.g., the server 1306 or the electronic device 1302 or 1304 of FIG. 13). The application 1570 may include a preloaded application or a third party application which is downloadable from a server. The names of the components of the program module 1510 may differ depending on kinds of operating systems.

According to various embodiments, at least a part of the program module 1510 may be implemented by software, firmware, hardware, or a combination of two or more thereof. At least a part of the program module 1510 may be implemented (e.g., executed) by the processor 1410. At least a portion of the program module 1510 may include modules, programs, routines, sets of instructions, processes, or the like, for performing one or more functions.

The term "module" used herein may represent a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments of the present disclosure may be implemented by instructions stored in a computer-readable storage media in the form of a program module. The instruction, when executed by the processor 1320, may cause the one or more processors to perform a function corresponding to the instruction. The computer-readable storage media may be the memory 1330.

A computer-readable recording medium may include a hard disk, a magnetic media, a floppy disk, a magnetic media (e.g., a magnetic tape), an optical media (e.g., a compact disc read only memory (CD-ROM) and a DVD, a magneto-optical media (e.g., a floptical disk), and hardware devices (e.g., a read only memory (ROM), a random access memory (RAM), or a flash memory). Also, a program instruction may include not only a mechanical code, such as generated by a compiler, but also a high-level language code executable on a computer using an interpreter. The above hardware unit may be configured to operate via one or more software modules for performing an operation of the present disclosure, and vice versa.

A module or a program module according to various embodiments of the present disclosure may include at least one of the above elements, or a part of the above elements may be omitted, or additional other elements may be further included. Operations performed by a module, a program module, or other elements according to various embodiments of the present disclosure may be executed sequentially, in parallel, repeatedly, or in a heuristic method. In addition, a part of operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure. Therefore, the scope of the present disclosure is defined, no by the detailed description and embodiments, but by the appended claims and their equivalents.

What is claimed is:

1. An electronic device comprising:
   a first display disposed on a first surface of the electronic device, the first display comprising:
   a display panel;
   a touch panel that receives a touch input for a specified object; and a pressure sensor that senses a pressure of the touch input;
   a second display disposed on a second surface opposite to the first surface of the electronic device; and
   a processor that outputs, on the first display, the specified object, and determines whether to output content associated with the specified object on the first display or the second display based on the pressure of the touch input by outputting the content associated with the touched specified object on the first display when the pressure of the touch input is less than a specified value and outputting the content associated with the touched specified object on the second display when the pressure of the touch input is greater than or equal to the specified value.

2. The electronic device of claim 1, wherein the processor adjusts an output area of the content based on the pressure of the touch input.

3. The electronic device of claim 2, wherein the processor enlarges the output area of the content, in response to an increase in the pressure of the touch input.

4. The electronic device of claim 2, wherein the processor reduces the output area of the content, in response to a decrease in the pressure of the touch input.

5. The electronic device of claim 4, wherein the processor stops an output of the content, when the touch input is ceased due to the decrease in the pressure of the touch input.

6. The electronic device of claim 5, wherein the specified object is an object associated with an application, and
wherein the content comprises content according to execution of the application.

7. The electronic device of claim 5, wherein the specified object corresponds to an object linked to at least one of a web document file, a text file, an image file, and a video file, and
wherein the content comprises content included in at least one of the web document file, the text file, the image file, and the video file.

8. The electronic device of claim 5, wherein the processor moves the specified object to a corresponding position on the second display based on the pressure of the touch input.

9. The electronic device of claim 5, wherein the processor provides the content to an application running on the second display, based on the pressure of the touch input.

10. The electronic device of claim 9, wherein at least a part of the provided content is output to a specified position on the second display.

11. The electronic device of claim 5, wherein, the processor causes at least one of the first display and the second display to further output a graphic effect corresponding to the pressure of the touch input to a position corresponding to the touch input.

12. The electronic device of claim 11, wherein the graphic effect output on the first display comprises a shape that is concave in a direction in which the pressure is applied.

13. The electronic device of claim 11, wherein the graphic effect output on the second display comprises a shape that is convex in a direction in which the pressure is applied.

14. A user interface providing method of an electronic device, the method comprising:
outputting a specified object on a first display, disposed on a first surface of the electronic device;
receiving a touch input for the specified object;
sensing a pressure of the touch input; and
determining whether to output content associated with the specified object to the first display or a second display based on the pressure of the touch input by outputting the content associated with the specified object, on the first display when the pressure of the touch input is less than a specified value and outputting the content associated with the touched specified object on the second display disposed on a second surface opposite to the first surface of the electronic device, when the pressure of the touch input is greater than or equal to the specified value.

15. The method of claim 14, wherein outputting the content comprises:
adjusting an output area of the content based on the pressure of the touch input.

16. The method of claim 14, further comprising:
providing the content to an application, which is running on the second display, based on the pressure of the touch input.

17. The method of claim 14, further comprising:
outputting a graphic effect corresponding to the pressure of the touch input to a position corresponding to the touch input.

18. A non-transitory computer-readable recording medium having recorded thereon an instruction, the instruction performing the operations of:
outputting a specified object on a first display, disposed on a first surface of the electronic device;
receiving a touch input for the specified object;
sensing a pressure of the touch input; and
determining whether to output content associated with the specified object to the first display or a second display based on the pressure of the touch input by outputting the content associated with the specified object; on the first display when the pressure of the touch input is less than a specified value, and outputting the content associated with the touched specified object on the second display disposed on a second surface opposite to the first surface of the electronic device, when the pressure of the touch input is greater than or equal to the specified value.

* * * * *